(12) United States Patent
Xu et al.

(10) Patent No.: US 12,114,249 B2
(45) Date of Patent: Oct. 8, 2024

(54) METHOD FOR IDENTIFICATION OF TRAFFIC SUITABLE FOR EDGE BREAKOUT AND FOR TRAFFIC STEERING IN A MOBILE NETWORK

(71) Applicant: Telefonaktiebolaget LM Ericsson (publ), Stockholm (SE)

(72) Inventors: Wenliang Xu, Shanghai (CN); Maria Luisa Mas Rosique, Tres Cantos (ES); Attila Mihály, Dunakeszi (HU); Jan Backman, Kärna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 242 days.

(21) Appl. No.: 17/782,421

(22) PCT Filed: Oct. 5, 2020

(86) PCT No.: PCT/IB2020/059346
§ 371 (c)(1),
(2) Date: Jun. 3, 2022

(87) PCT Pub. No.: WO2021/064717
PCT Pub. Date: Apr. 8, 2021

(65) Prior Publication Data
US 2023/0354149 A1 Nov. 2, 2023

Related U.S. Application Data

(60) Provisional application No. 62/910,767, filed on Oct. 4, 2019.

(30) Foreign Application Priority Data

Dec. 18, 2019 (WO) ................ PCT/CN2019/126159

(51) Int. Cl.
*H04W 40/20* (2009.01)
*H04L 45/02* (2022.01)
(Continued)

(52) U.S. Cl.
CPC ............. *H04W 40/20* (2013.01); *H04L 45/04* (2013.01); *H04L 61/4511* (2022.05); *H04W 28/0268* (2013.01); *H04W 40/246* (2013.01)

(58) Field of Classification Search
CPC ............ H04W 40/20; H04W 28/0268; H04W 40/246; H04L 45/04; H04L 61/4511
See application file for complete search history.

(56) References Cited

U.S. PATENT DOCUMENTS 10,033,692 B1 * 7/2018 Vavrusa .................. H04L 61/59
11,122,004 B1 * 9/2021 Kaczmarek ........... H04L 61/106
(Continued)

FOREIGN PATENT DOCUMENTS

WO  2012/167153 A1  12/2012
WO  2021/064218 A1  4/2021

OTHER PUBLICATIONS https://portal.3gpp.org/desktopmodules/Specifications/SpecificationDetails.aspx?specificationId=3145 version 16.2.0 Sep. 24, 2019.*
(Continued)

*Primary Examiner* — Jimmy H Tran
(74) *Attorney, Agent, or Firm* — Sonoda & Kobayashi intellectual Property Law; Sarvajit S. Patil

(57) ABSTRACT

The disclosure relates to a method executed in a domain name system (DNS) proxy, and to a DNS proxy, apparatus or system for application server (AS) discovery for edge computing in a mobile network. The method comprises receiving a DNS query from a user equipment (UE) with an application fully qualified domain name (FQDN). Based on FQDN, retrieving a location of the UE that sent the DNS (Continued)

```
                +0 (MSB)                                           +1 (LSB)
       +---+---+---+---+---+---+---+---+---+---+---+---+---+---+---+---+
    0: |                          OPTION-CODE                          |
       +---+---+---+---+---+---+---+---+---+---+---+---+---+---+---+---+
    2: |                         OPTION-LENGTH                         |
       +---+---+---+---+---+---+---+---+---+---+---+---+---+---+---+---+
    4: |                            FAMILY                             |
       +---+---+---+---+---+---+---+---+---+---+---+---+---+---+---+---+
    6: |     SOURCE PREFIX-LENGTH      |      SCOPE PREFIX-LENGTH      |
       +---+---+---+---+---+---+---+---+---+---+---+---+---+---+---+---+
    8: |                           ADDRESS...                          /
       +---+---+---+---+---+---+---+---+---+---+---+---+---+---+---+---+
``` query; adding subnet(s) or full IP address(es) of one or more preferred location for accessing to a data network (DN) as one or more Extension mechanisms for DNS (EDNS) client subnet (ECS) options in the DNS query; forwarding the DNS query to a mobile network operator (MNO) DNS; receiving a DNS response and based on the DNS response determining an AS site and AS IP address(es); requesting traffic steering and sending the DNS response to the UE.

27 Claims, 12 Drawing Sheets

(51) Int. Cl.
*H04L 61/4511* (2022.01)
*H04W 28/02* (2009.01)
*H04W 40/24* (2009.01)

(56) References Cited

U.S. PATENT DOCUMENTS

| | | | | |
|---|---|---|---|---|
| 2011/0058479 | A1* | 3/2011 | Chowdhury | H04W 36/22 370/237 |
| 2014/0153489 | A1* | 6/2014 | Perras | H04W 60/00 370/328 |
| 2016/0219013 | A1* | 7/2016 | Lapidous | H04L 63/0272 |
| 2016/0380975 | A1* | 12/2016 | Reddy | H04L 61/4511 726/12 |
| 2017/0374015 | A1* | 12/2017 | Siba | H04L 61/4511 |
| 2020/0374229 | A1* | 11/2020 | Vysotsky | H04L 41/12 |
| 2020/0382465 | A1* | 12/2020 | Halley | H04L 67/568 |
| 2021/0007166 | A1* | 1/2021 | Liao | H04W 48/16 |
| 2021/0029074 | A1* | 1/2021 | Buck | H04L 63/0236 |
| 2021/0092089 | A1* | 3/2021 | Gray | H04L 67/1021 |
| 2021/0176327 | A1* | 6/2021 | Soliman | H04M 15/64 |
| 2021/0176613 | A1* | 6/2021 | Purkayastha | H04L 67/10 |
| 2021/0345108 | A1* | 11/2021 | Li | H04W 36/14 |
| 2022/0109633 | A1* | 4/2022 | Li | H04L 61/58 |
| 2022/0124065 | A1* | 4/2022 | Dao | H04L 61/5007 |
| 2022/0174032 | A1* | 6/2022 | Zhu | H04L 67/146 |
| 2022/0191667 | A1* | 6/2022 | Starsinic | H04L 67/00 |
| 2023/0396582 | A1* | 12/2023 | Roy | H04L 67/14 |

OTHER PUBLICATIONS https://datatracker.ietf.org/doc/html/rfc7871 May 2016.*
International Search Report and Written Opinion dated Dec. 1, 2020 issued in PCT Application No. PCT/IB2020/059346, consisting of 12 pages.
3GPP TR 23.748 V0.0.0 (Oct. 2019) 3rd Generation Partnership Project; Technical Specification Group Services and System Aspects; Study on enhancement of support for Edge Computing in the 5G Core Network (5GC) (Release 17), consisting of 8 pages.
3GPP TS 23.502 V16.2.0 (Sep. 2019) 3rd Generation Partnership Project; Technical Specification Group Services and System Aspects; Procedure for the 5G System (5GS) Stage 2 (Release 16) consisting of 525 pages.
3GPP TS 23.501 V16.2.0 (Sep. 2019) 3rd Generation Partnership Project; Technical Specification Group Services and System Aspects; System Architecture for the 5G System (5GS) Stage 2 (Release 16) consisting of 391 pages.
3GPP TS 29.514 V16.2.0 (Sep. 2019) 3rd Generation Partnership Project; Technical Specification Group Core Network and Terminals; 5G System; Policy Authorization Service; Stage 3 (Release 16) consisting of 127 pages.

* cited by examiner

```
  +0 (MSB)                    +1 (LSB)
 +-+-+-+-+-+-+-+-+-+-+-+-+-+-+-+-+
0: |          OPTION-CODE          |
 +-+-+-+-+-+-+-+-+-+-+-+-+-+-+-+-+
2: |         OPTION-LENGTH         |
 +-+-+-+-+-+-+-+-+-+-+-+-+-+-+-+-+
4: |            FAMILY             |
 +-+-+-+-+-+-+-+-+-+-+-+-+-+-+-+-+
6: | SOURCE PREFIX-LENGTH | SCOPE PREFIX-LENGTH |
 +-+-+-+-+-+-+-+-+-+-+-+-+-+-+-+-+
8: |          ADDRESS...           |
 +-+-+-+-+-+-+-+-+-+-+-+-+-+-+-+-+
```

Figure 1

METHOD FOR IDENTIFICATION OF TRAFFIC SUITABLE FOR EDGE BREAKOUT AND FOR TRAFFIC STEERING IN A MOBILE NETWORK

CROSS-REFERENCE TO RELATED APPLICATIONS

This application is a Submission Under 35 U.S.C. § 371 for U.S. National Stage Patent Application of International Application No.: PCT/IB2020/059346, filed Oct. 5, 2020 entitled "METHOD FOR IDENTIFICATION OF TRAFFIC SUITABLE FOR EDGE BREAKOUT AND FOR TRAFFIC STEERING IN A MOBILE NETWORK," which claims priority to U.S. Provisional Application No. 62/910,767, filed Oct. 4, 2019 entitled "DYNAMIC ACTIVATION OF LOCAL BREAKOUT WITH COORDINATION BETWEEN APPLICATION DOMAIN AND MOBILE NETWORK" and International Application No. PCT/CN2019/126159 filed Dec. 18, 2019 entitled "METHOD FOR IDENTIFICATION OF TRAFFIC SUITABLE FOR EDGE BREAKOUT AND FOR TRAFFIC STEERING IN A MOBILE NETWORK", the entireties of all of which are incorporated herein by reference.

TECHNICAL FIELD

The present disclosure relates to edge computing and traffic steering in mobile network.

BACKGROUND

Edge Computing is a network architecture concept that enables cloud computing capabilities and service environments to be deployed at the edge of the cellular network. It promises several benefits such as lower latency, higher bandwidth, reduced backhaul traffic and possibilities for several new services.

Domain Name System (DNS)

The Domain Name System (DNS) is a hierarchical and decentralized naming system for computers, services, or other resources connected to the Internet or a private network. It associates various information with domain names assigned to each of the participating entities. Most prominently, it translates more readily memorized domain names to the numerical internet protocol (IP) addresses needed for locating and identifying computer services and devices with the underlying network protocols.

The Domain Name System has been defined by Internet Engineering Task Force (IETF) and specifies the technical functionality of the database service that is at its core. It defines the DNS protocol, a detailed specification of the data structures and data communication exchanges used in the DNS, as part of the Internet Protocol Suite.

The Internet maintains two principal namespaces, the domain name hierarchy (3GPP TS 23.501 v.16.2.0 System Architecture for the 5G System (5GS); Stage 2, Release 16) and the Internet Protocol (IP) address spaces (RFC 7871, Client Subnet in DNS Queries, C. Contavalli, W. van der Gaast, D. Lawrence, W. Kumari, May 2016). The Domain Name System maintains the domain name hierarchy and provides translation services between it and the address spaces. A DNS name server is a server that stores the DNS records for a domain; a DNS name server responds with answers to queries against its database.

The following are referred to herein:

Stub Resolver: A simple DNS protocol implementation on the client side as described in RFC1034, Section 5.3.1.

Authoritative Nameserver: A nameserver that has authority over one or more DNS zones. These are normally not contacted by Stub Resolver or end user clients directly but by Recursive Resolvers, described in RFC1035, Section 6.

Recursive Resolver: A nameserver that is responsible for resolving domain names for clients by following the domain's delegation chain. Recursive Resolvers frequently use caches to be able to respond to client queries quickly, described in RFC1035, Section 7.

Forwarding Resolver: A nameserver that passes that responsibility to another Recursive Resolver, called a "Forwarder", described in RFC2308, Section 1.

Intermediate Nameserver: Any nameserver in between the Stub Resolver and the Authoritative Nameserver, such as a Recursive Resolver or a Forwarding Resolver.

DNS is the most commonly used mechanism for Application clients to discover the IP address of Applications in the internet. It allows users to handle application hostnames and have them translated into the IP address of the Application Server.

DNS today can return different responses based on the perceived topological location of the user. These servers use the IP address of the incoming query to identify that location. Since most queries come from Intermediate Recursive Resolvers, the source address is that of the Recursive Resolver rather than of the query originator. Traditionally, and probably still in the majority of instances, recursive Resolvers are reasonably close in the topological sense to the query originator. For these resolvers, using their own IP address is sufficient for Authoritative Nameservers that tailor responses based upon location of the querier.

RFC 7871: Client Subnet in DNS Queries

To address the case of Recursive Resolvers that are not topologically close to the query originator, IETF has defined RFC 7871. This document defines an EDNS0 (that is, a DNS extension according to RFC6891) option to convey network information that is relevant to the DNS message. It can carry sufficient network information about the originator for the Authoritative Nameserver to tailor responses. It also provides for the Authoritative Nameserver to indicate the scope of network addresses for which the tailored answer is intended.

RFC 7871 defines format and protocol handling of the edns-client-subnet, also spelled Extension mechanism for DNS (EDNS) Client Subnet (ECS) EDNS0 option. That is meant to be sent in queries sent by Intermediate Nameservers in a way that is transparent to query originators like stub resolvers, and to end user. An Authoritative Nameserver could use ECS as a hint to the end user's network location and provide a better answer. Its response would also contain an ECS option, clearly indicating that the server made use of this information, and that the answer is tied to the client's network. The ECS option in the response is intended to guide the caching of the answer provided.

This protocol uses an EDNS0 option, defined in RFC6891, to include client address information in DNS messages. The option 100 is structured as illustrated in FIG. 1 and as described below.

OPTION-CODE, 2 octets, for ECS is 8 (0x00 0x08), (defined in RFC6891).

OPTION-LENGTH, 2 octets, contains the length of the payload (everything after OPTION-LENGTH) in octets, (defined in RFC6891).

FAMILY, 2 octets, indicates the family of the address contained in the option, using address family codes as assigned by Internet Assigned Numbers Authority (IANA) in Address Family Numbers [Address_Family_Numbers]. The format of the address part depends on the value of FAMILY. This document only defines the format for FAMILY 1 (IPv4) and FAMILY 2 (IPv6), which are as follows.

SOURCE PREFIX-LENGTH, an unsigned octet representing the leftmost number of significant bits of ADDRESS to be used for the lookup. In responses, it mirrors the same value as in the queries.

SCOPE PREFIX-LENGTH, an unsigned octet representing the leftmost number of significant bits of ADDRESS that the response covers. In queries, it MUST be set to 0.

ADDRESS, variable number of octets, contains either an IPv4 or an IPv6 address, depending on FAMILY, which MUST be truncated to the number of bits indicated by the SOURCE PREFIX-LENGTH field, or padding with 0 bits to pad to the end of the last octet needed.

Edge Computing in 3GPP

The 5G networks architecture is defined in 3GPP Release 16. FIG. 2a depicts the 5G reference architecture 200 as defined by 3GPP TS 23.501.

It is worth highlighting the role of some Network Functions shown in this figure.

Session Management Function (SMF), is responsible for Session establishment, modification and release, including selection and control of the User Plane Function (UPF) entities, maintaining the topology of the involved Protocol Data Unit (PDU) Session Anchor (PSA) UPFs, establishing and releasing the tunnel between Access Network (AN) and UPF and between UPFs. It also configures traffic forwarding at UPF. SMF interacts with the UPF over N4 Reference point using Packet Forwarding Control Protocol (PFCP) procedures.

User Plane Function (UPF), handles the user data traffic. Among other, it provides the external PDU Session point of interconnect to Data Network (PDU session anchor) and performs packet routing & forwarding (e.g. support of Uplink classifier (UL CL) to route traffic flows to an instance of a data network, support of Branching point to support multi-homed PDU Session).

As stated in TS 23.501, clause 5.13, edge computing enables operator and 3rd party services to be hosted close to the User Equipment (UE)'s access point of attachment, so as to achieve an efficient service delivery through a reduced end-to-end latency and load on the transport network. The 5G Core Network selects a UPF close to the UE and executes the traffic steering from the UPF to the local Data Network via a N6 interface.

A number of enablers have been defined that alone or in combination support Edge Computing (chapter 5.13. in TS 23.501), including the following.

User plane (re)selection: the 5G Core Network (re)selects UPF to route the user traffic to the local Data Network as described in clause 6.3.3.

Local Routing and Traffic Steering: the 5G Core Network selects the traffic to be routed to the applications in the local Data Network, this includes the use of a single PDU Session with multiple PDU Session Anchor(s) (UL CL/IP v6 multi-homing) as described in clause 5.6.4.

A PDU session has multiple PDU session anchors (PSAs) when it has more than one access (i.e. N6 interface) to the same Data Network.

Data Network (DN) Access Identifier (DNAI) identifies locations of the N6 access to the DN. It is mostly used in the procedures intended to influence the Steering of certain traffic to a local access of the DN.

Uplink Classifier (UL CL)

One reason to have a single PDU Session with multiple PDU Session Anchor(s) (UL CL/IP v6 multi-homing) is to do selective traffic routing to the DN and be able to steer traffic differently for different applications (i.e. different applications can access the Data Network at different locations).

TS 23.501, chapter 5.6.4.2, describes the Usage of an Uplink Classifier (UL CL) for a PDU Session. The SMF may decide to insert an UL CL during or after the PDU Session Establishment. The UL CL aims at diverting (locally) some traffic matching traffic filters provided by the SMF. The insertion and removal of an UL CL is decided by the SMF and controlled by the SMF using N4 Reference Point. When an UL CL functionality has been inserted in the data path of a PDU Session, there are multiple PDU Session Anchors for this PDU Session. These PDU Session Anchors provide different access to the same DN, as shown in FIG. 2b.

The UL CL provides forwarding of UL traffic towards different PDU Session Anchors and merge of Downlink (DL) traffic to the UE i.e. merging the traffic from the different PDU Session Anchors on the link towards the UE. This is based on traffic detection and traffic forwarding rules provided by the SMF. The UL CL applies filtering rules (e.g. to examine the destination IP address/Prefix of UL IP packets sent by the UE) and determines to which PDU session anchor the packet should be routed. Once the UL CL has been inserted, all the traffic of a PDU session traverses that UL CL.

SUMMARY

A method executed in a domain name system (DNS) proxy for application server (AS) discovery and traffic steering for edge computing in a mobile network. The method comprises receiving a DNS query from a user equipment (UE) with an application fully qualified domain name (FQDN). The method comprises upon determining that there is a service level agreement (SLA) in place for an application corresponding to the FQDN, obtaining a location of the UE that sent the DNS query from a control plane. The method comprises adding at least one subnet or full IP address of one or more preferred location for accessing to a data network (DN) as one or more Extension mechanisms for DNS (EDNS) client subnet (ECS) options in the DNS query. The method comprises forwarding the DNS query to a mobile network operator (MNO) DNS. The method comprises receiving a DNS response comprising an ECS option, the ECS option being tailored to a corresponding ECS option of the one or more ECS options in the DNS query. The method comprises triggering actions to set up traffic steering according to the ECS option received in the DNS response. The method comprises removing the ECS option from the DNS response and sending the DNS response to the UE.

There is provided a method executed in a domain name system (DNS) proxy for identification of traffic suitable for edge breakout and for traffic steering in a mobile network, comprising: receiving a DNS query from a user equipment (UE) with an application fully qualified domain name (FQDN); upon determining that edge computing is applicable to the DNS query, adding one or more internet protocol (IP) address, IP address range or IP subnet as one or more Extension mechanisms for DNS (EDNS) client subnet (ECS) option to the DNS query, corresponding to one or more preferred location for accessing to a data network (DN); and forwarding the DNS query. In this context, an IP subnet is a subset of the IP address, i.e. some of the bits of the IP address, starting at the beginning of the address at the most significant bits (MSB). When the DNS query is forwarded, it is forwarded to the next DNS in the architecture. It may be forwarded to a dedicated forwarder for addresses that are outside the network.

There is provided an apparatus or system, for identification of traffic suitable for edge breakout and for traffic steering in a mobile network comprising processing circuits and a memory, the memory containing instructions executable by the processing circuits whereby the apparatus or system is operative to execute any of the steps described herein.

There is provided a domain name system (DNS) proxy for identification of traffic suitable for edge breakout and for traffic steering in a mobile network operative to execute any of the steps described herein.

There is provided an apparatus or system, for application server (AS) discovery for edge computing in a mobile network comprising processing circuits and a memory, the memory containing instructions executable by the processing circuits whereby the apparatus or system is operative to execute any of the steps described herein.

There is provided a domain name system (DNS) proxy for application server (AS) discovery for edge computing in a mobile network operative to execute any of the steps described herein.

There is provided a non-transitory computer readable media having stored thereon instructions for executing any of the steps of the methods described herein.

The method and DNS proxy, apparatus or system provided herein present improvements to the way edge computing operates.

BRIEF DESCRIPTION OF THE DRAWINGS

FIG. 1 is a schematic illustration of a structure of an EDNS0 [RFC6891] option to include client address information in DNS messages.

DETAILED DESCRIPTION

Figure 2A:
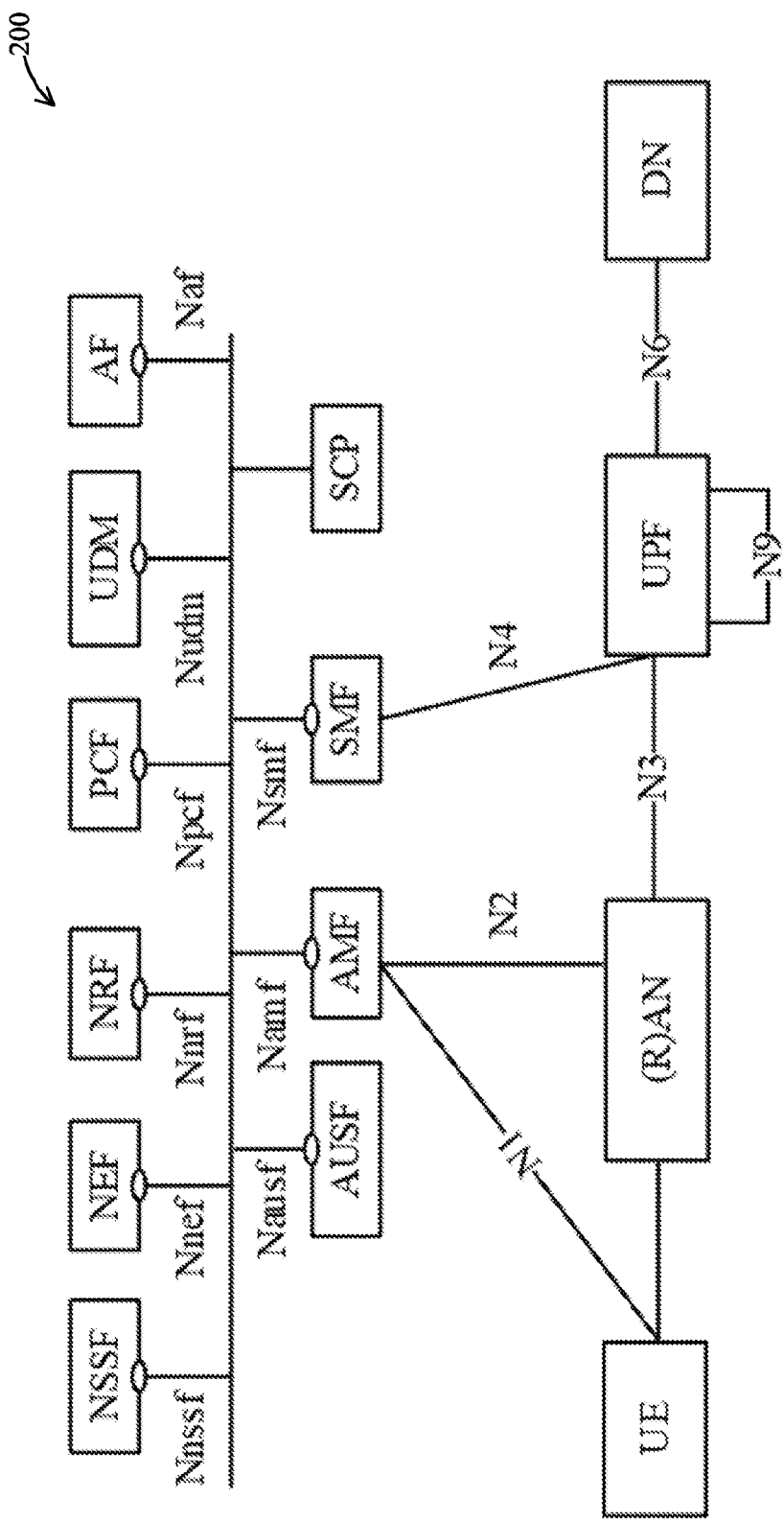
FIG. 2a is a schematic illustration of the fifth generation (5G) Network Architecture.
Figure 2B:
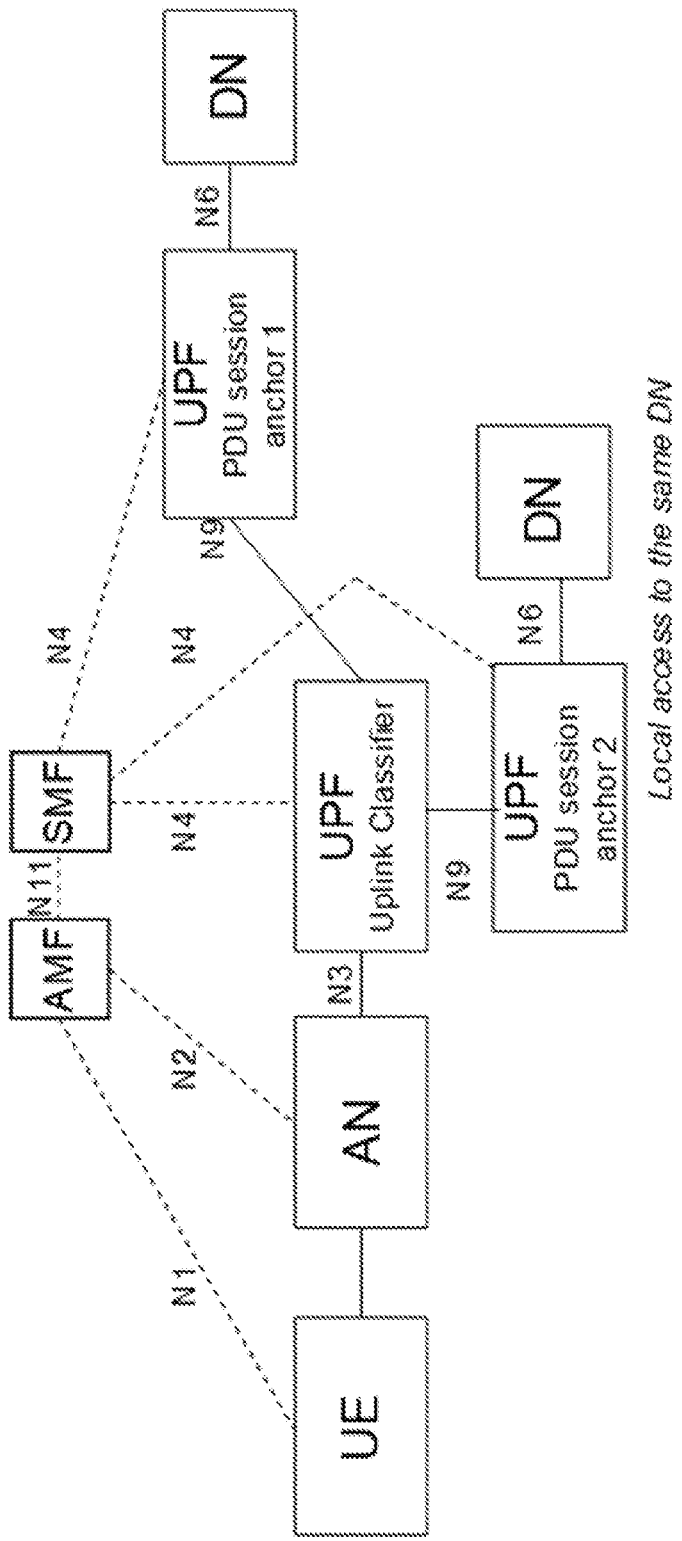
FIG. 2b is a schematic illustration of a user plane architecture for the uplink classifier.

Various features will now be described with reference to the figures to fully convey the scope of the disclosure to those skilled in the art.

Sequences of actions or functions may be used within this disclosure. It should be recognized that some functions or actions, in some contexts, could be performed by specialized circuits, by program instructions being executed by one or more processors, or by a combination of both.

Further, computer readable carrier or carrier wave may contain an appropriate set of computer instructions that would cause a processor to carry out the techniques described herein.

The functions/actions described herein may occur out of the order noted in the sequence of actions or simultaneously. Furthermore, in some illustrations, some blocks, functions or actions may be optional and may or may not be executed; these are generally illustrated with dashed lines.

A DNS core component, called DNS proxy (which could alternatively be called DNS server, DNS service, DNS Application Function (AF) (DNS AF), or any other suitable name) is used to identify what traffic may be subject for edge breakout. The DNS proxy adds information, i.e. a list of possible locations for DN access, to the DNS queries when edge computing applies for a DNS query, using some extensions defined by DNS: the EDNS client subnet. When this information is added to the DNS query, in the resolution of the DNS, the information can be used to tailor the DNS response. The DNS response can include the ECS option as well, which corresponds to the ECS option from the query to which the response is tailored. In this way, when the DNS response is received in the DNS proxy, the answer corresponds to the ECS option, and the DNS proxy can tune the traffic steering to meet the DNS response.

For example, when a user wants to connect to a service on the internet, the user first enters or requests for the location of the service, e.g. domain.com, and then gets back an IP address. If some special handling is to be done in response to some queries for domain.com, then the DNS proxy looks into the domain name, the Fully Qualified Domain Name (FQDN), domain.com, which can take different forms, and can determine if there is special handling for making DNS queries for that particular traffic. DNS today can return different responses based on the perceived topological location of the user. These servers use the IP address of the incoming query to identify that location. Not all DNS queries are sent to the edge because the edge should not be invoked unless there is traffic running there; and, one way to have a DNS response for the edge, is to do DNS traffic breakout from the edge. Since breakout consumes edge costly resources and adds an extra hop to all the user PDU session data traffic, it should only be done when necessary. The DNS should not consistently be done from the edge and this is why a DNS proxy, more centralized, is proposed for handling the DNS queries (also called DNS Requests).

In older technologies, when a user connected to the mobile network with a device, an IP address was assigned to the device, which remained the same even if the user changed locations (even for long distances), and this was generally true until the device was disconnected for a period of time or until the device was rebooted. This was referred to as having a central anchor point and the IP address was provided by e.g. a national site. With the fourth and fifth generation mobile networks, the concept of distributed anchor point was introduced where a regional site assigned the IP address to the device. Functionalities allowing to force a device to re-connect was also introduced for when the device went outside the area of the anchor or of the IP address assigned to it. This provided to the devices the capability to access services in closer proximity. However, this re-connect meant that the device was disconnected when a new IP address was allocated to it. All ongoing data traffic was lost, and all applications needed to re-register, etc.

With 3GPP standardized session breakout, there is a centralized anchor in the network and a local site that takes over or "steels" some of the traffic and sends it to a local service. With this type of session breakout, one drawback is that all the traffic must pass the local site in order to decide which traffic to break out.

Presented herein is a version of session breakout where the DNS queries are made towards a DNS proxy in a centralized site, which detects domain names for which edge computing may be available and look at responses from DNS servers to see if something needs to be broken out on the edge. Going through the edge sites is done to optimize the data path between the UE and the selected (as in DNS response) Edge Applications.

As stated previously, the UL CL provides forwarding of UL traffic towards different PDU Session Anchors and merge of Downlink (DL) traffic to the UE i.e. merging the traffic from the different PDU Session Anchors on the link towards the UE. Having an Uplink Classifier inserted in the PDU session consumes operator resources at the edge. For this reason, dynamic insertion of an UL CL is preferred: by inserting the UL CL only when there is an actual need of diverting (locally) some user traffic, there is a more efficient usage of operator resources.

As an alternative, different PDU sessions can be established to meet the access needs of the different applications. However, that has an impact in the UEs and involves multiple parties and is not yet available.

Edge Application Server Discovery in Mobile Networks

Herein, a solution is described for Edge Application Server (EAS) Selection for the scenario where the UEs are Edge Computing Service agnostic, i.e., no specific UE functionality is assumed for the EAS selection. Therefore, the solution leverages on the UE DNS messaging for the Application Server resolution. A single UE PDU session is assumed with local session break-out for the given Application traffic. It is also assumed that the MNO exposure APIs are not used by the Edge Service Provider. The Mobile Core assists the discovery of most suitable Application Server by adding the potential local PSA network location(s) as ECS option(s) to the DNS request or forwarding the DNS request to a DNS serving the location of the UE. Based on this information, the Service Provider selects an EAS that matches that suggestion and may feed information back to the Mobile Network on whether the selection has been tailored to the information provided, by using the ECS option described in RFC 7871. The Mobile Core then inserts the UL CL and sets up the traffic steering accordingly.

3GPP Mobile Terminals have a DNS Stub Resolver in their Operative System that originates DNS queries as required by the Applications in the UE. At PDU session establishment, the Mobile Network can provide the UE with the address of a DNS server in the Protocol Configuration Option (PCO), typically the operator DNS. The UE DNS client then sends the DNS queries of applications using that PDU session to the provided DNS server.

With Edge Computing, Applications Servers can be distributed and be deployed at the edge of the cellular networks. In this scenario, the Edge Application Server that is topologically closest to the UE should be selected. It is topological distance that matters, that is the number of hops or the time it takes for a packet to travel from one host to the other, and that is not necessarily related to geographical distance, but to how the traffic is routed between the UE and the Application Server. Therefore, for edge Computing both Edge Application Server and a suitable local UPF that steers the application traffic via the N6 interface to the best access to the Data Network need to be selected. This requires the following: DNS returning the Edge Application Server that is closest (topological distance) to the UE; A Local UPF, which provides: the N6 interface access to the data Network (i.e. a PSA) with optimal routing to the that Edge Application Server, and an UL CL as defined in TS 23.501 chapter 5.6.4.2. that is able to selectively steer the UL traffic of this application to the selected PSA, and to aggregate the traffic of the PDU Session in the DL.

There could be different UPFs for each of these two roles.

The solution should allow for dynamic UL CL insertion, as that is preferred from a resource efficiency point of view.

Figure 3:
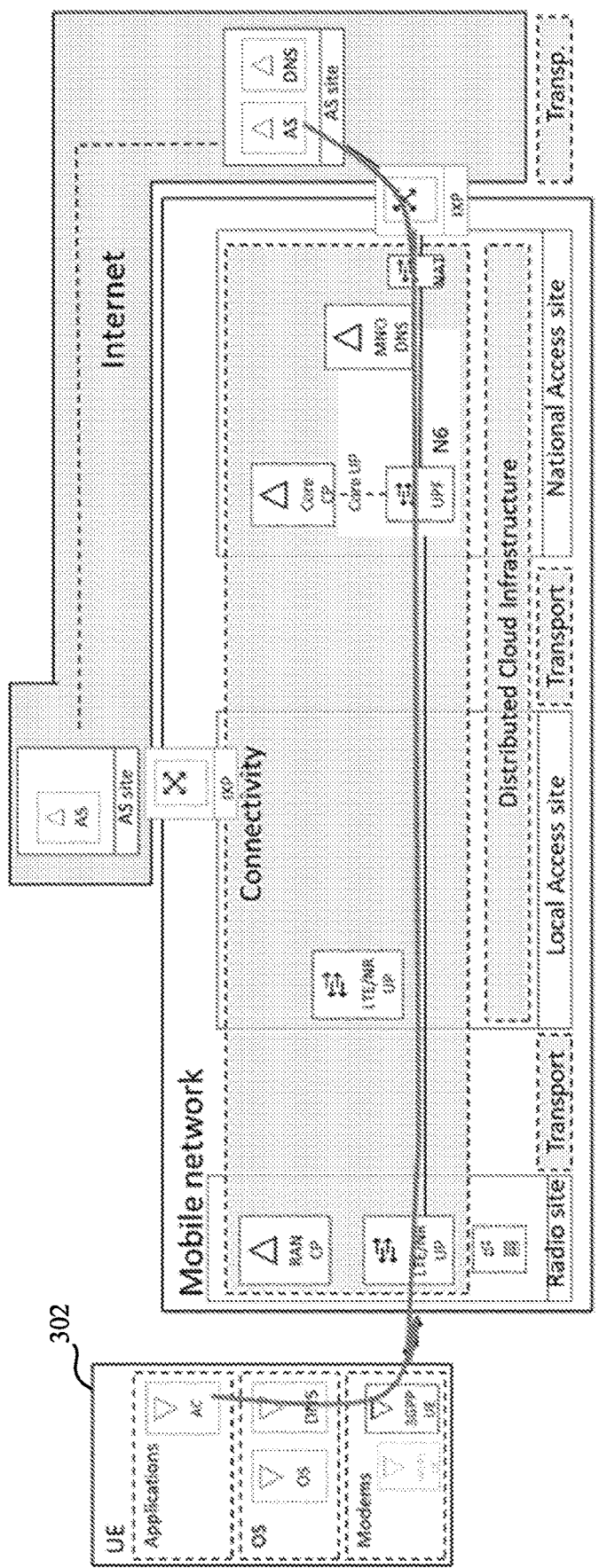
FIG. 3 is a schematic illustration of an application server selection tailored to mobile network operator (MNO) central domain name system (DNS).

When the UL CL is inserted dynamically, there is no UL CL originally and so no local diversion of the DNS queries is possible. The Recursive Resolver is then typically behind the central PDU session anchor and so topologically far from the query originator. Its IP address cannot be used to tailor the response and provide an Edge Application server close to the UE. The response will in principle include the address of an Application Server which is close to the central PDU session anchor, even if another EAS is deployed closer to the UE 302, see FIG. 3.

To enable EAS selection and dynamic traffic routing, the solution involves a Service Level Agreement between the Mobile Network Operator (MNO) and the Service Provider. As part of the agreement, the Service provider shares the following with the MNO.

The Application (s) FQDN(s) that will be used by Application clients to discover the Application Server using DNS.

The location(s) of edge site(s) at which the edge AS(s) for each Application are placed ("AS Site" from now on).

An Internet Protocol (IP) address for an edge DNS server.

The IP address ranges that are used by the ASs at each "AS Site".

This information is used by the MNO to produce a Translation Table that maps a given user location and application into the preferred PDU session anchor(s) (PSA (s)), including information of corresponding subnet (or full IP address) of that N6 access to the DN after NAT. Also, the AS IP address ranges that may be used by the UE in the communication with the AS(s) and to be configured in the UL CL.

Figure 4:
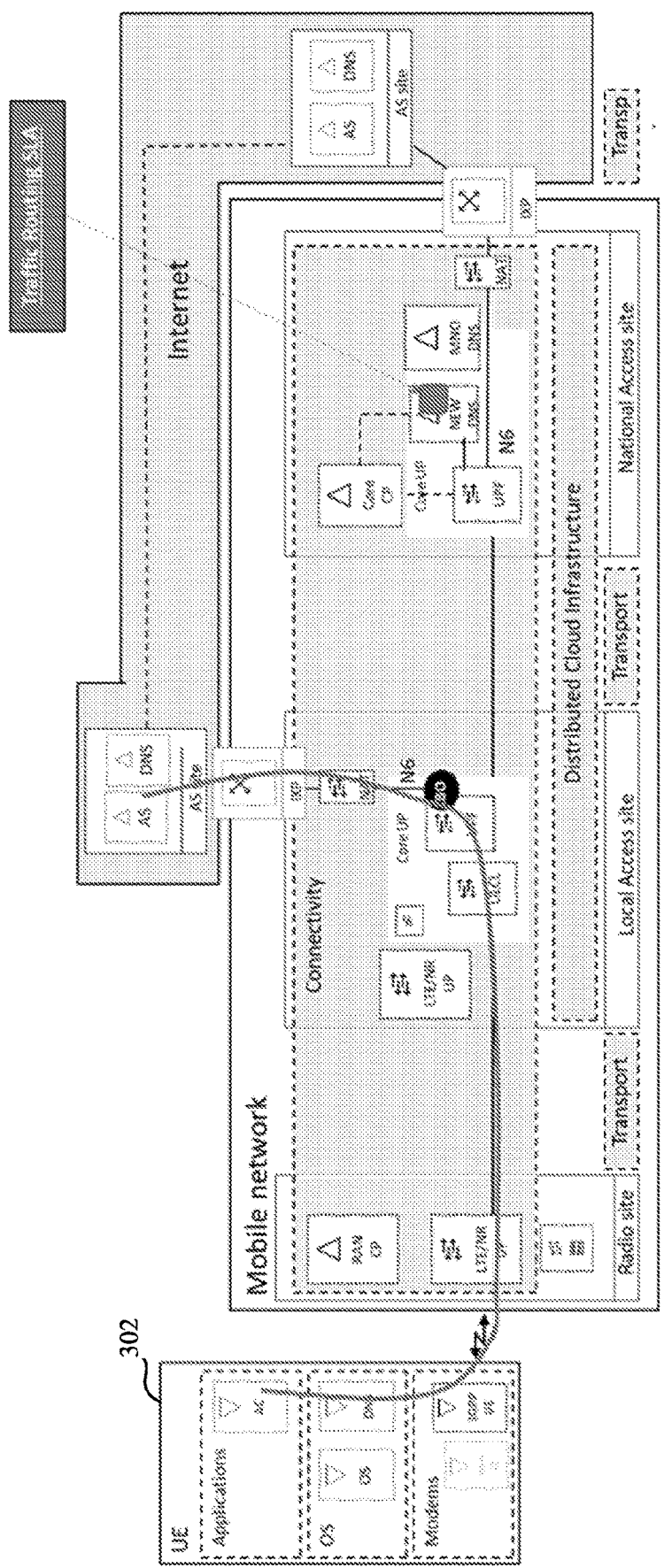
FIG. 4 is a schematic illustration of an application server selection tailored to local site DNS.

The solution of the previous work introduced a new DNS component in the Mobile Network, that uses the above information and the Mobile Network knowledge of the user actual location to involve a Local DNS as Recursive Resolver. That Local DNS is topologically close to the query originator (the UE) and the edge site(s) at which the edge AS(s) are placed. Its IP address can be used then to tailor the response and select an AS that is topologically close to the UE 302, see FIG. 4.

However, the solution of the previous work puts the responsibility on the MNO to adapt the PDU session to match the DNS answer. It requires the Mobile Network to check the DNS response and act upon that. The Mobile Core needs to calculate the most suitable PDU session anchor for the Application server that has been selected: the DNS response needs to be evaluated.

The Mobile Core needs to calculate IP distances between possible anchors and the selected Edge AS, and select the most suitable one, which might not correspond to the Local DNS provided previously. e.g. if an Edge AS is not desired. If that step is skipped, the insertion and configuration of a Local UPF might not match the AS selection. In that case, resources would be consumed at the Mobile Network Local Access site without achieving the optimal traffic routing desired.

The solution of the previous work required to have Local DNSs that can handle the application at each site. On the application side, the AS selection mechanism can only consider the position (and the IP distances) from the local DNS server that receives the request, but no information is available regarding other potential PDU session anchors that the MNO could potentially choose.

Described herein is an alternative solution based on DNS options that address the problems listed previously.

The previous work (presented in U.S. provisional application 62/910,767 filed Oct. 4, 2019, included herein by reference in its entirety) introduced a new DNS component. A summary of this previous work is presented in the following four paragraphs. The DNS function obtains (e.g., is configured with) the information for an edge Application Server (AS) site (e.g., information from the traffic routing Service Level Agreement (SLA)). The DNS function receives a DNS query from a UE and determines whether the DNS query is applicable to any edge AS site or edge AS. More specifically, the DNS function determines whether the FQDN included in the DNS query matches the domain name handled by any traffic routing SLA information set defined in any traffic routing SLA of any edge AS site or edge AS for which the DNS function is configured. If this is not the case, then normal DNS query processing is performed (e.g., the DNS function forwards the DNS query to the DNS infrastructure in the normal manner (e.g., via the MNO DNS or other DNS server)).

If the FQDN included in the DNS query is part of one or more traffic routing SLA information sets, then the DNS function checks the current location of the UE against the edge site/AS location in the traffic routing SLA information set(s) that match the FQDN included in the DNS query. If there are no matches, then normal DNS query process is performed.

However, if there are one or more traffic routing information sets that both match the FQDN included in the received DNS query and have edge site/AS locations that match the UE location, then the DNS query is applicable to the corresponding one or more edge sites/ASs. As such, the DNS function performs edge site/AS selection. In particular, if the UE location matches the edge site/AS location from more than one of the traffic routing SLA information sets that matched the FQDN included in the DNS query, then the DNS function selects the edge site/AS corresponding to one of those traffic routing SLA information sets (e.g., selects the edge site/AS that corresponds to one of those traffic routing SLA information sets for which the UE location most closely matches (e.g., is closest to) the edge site/AS location). If there is only one traffic routing SLA information set for which the UE location matches the edge site/AS location, then the edge site/AS that corresponds to that traffic routing SLA information set is selected. Note that in the discussion above, the DNS function first checks the FQDN and then checks the location. However, the DNS function may alternatively check the location first and then check the FQDN.

Upon selecting the edge AS site/edge AS, the DNS function sends the DNS query to the edge site DNS (e.g., using the IP address of the edge site DNS provided by the traffic routing SLA). The DNS function receives a DNS response and determines whether the IP address included in the DNS response is one that is served by the edge AS site or edge AS (e.g., is within the IP address range defined in the traffic routing SLA for the edge AS site or edge AS). If so, the DNS function triggers activation of Local Break Out (LBO) (e.g., triggers activation of the UL CL and the UPF at the respective breakout site, and sends the DNS response back towards the UE. If the IP address in the DNS response is not one served by the edge AS, the DNS function does not trigger activation of LBO and sends the DNS response towards the UE.

Operation of the DNS function is explained. The DNS function obtains (e.g., is configured with) the information for the edge AS site (e.g., the information from the traffic routing SLA described above). The DNS function receives a DNS query from the UE and determines whether the DNS query is applicable to any edge AS site or edge AS. More specifically, the DNS function determines whether the FQDN included in the DNS query matches the domain name handled by any traffic routing SLA information set defined any traffic routing SLA of any the edge AS site or edge AS for which the DNS function is configured. If this is not the case, then normal DNS query processing is performed (e.g., the DNS function forwards the DNS query to the DNS infrastructure in the normal manner (e.g., via the MNO DNS or other DNS server)). If the FQDN included in the DNS query is part of one or more traffic routing SLA information sets, then the DNS function checks the current location of the UE against the edge site/AS location in the traffic routing SLA information set(s) that match the FQDN included in the DNS query. If there are no matches, then normal DNS query process is performed.

An additional functionality, called DNS Proxy, related to the "New DNS" component (described in the previous four paragraphs and fully introduced in previous work), is provided herein.

The DNS Proxy receives the UE request for an FQDN related to an Edge AS and determines first at least one suitable local PDU session anchor (PSA) point for that UE location and application. The Mobile Core then assists the discovery of the most suitable Application Server for that PSA(s) by adding the PSA network location(s) as ECS option(s) to the DNS request. At that stage, it is up to the Service Provider to select an Edge Application Server (EAS) that matches that suggestion. The Service Provider feeds back information to the Mobile Network on whether the selection has been tailored to the information provided, by using the ECS option. The Mobile Core then inserts the UL CL and sets up the traffic steering accordingly. If no ECS is returned, the central anchor is assumed to be the default option.

At the Mobile Core side, the "DNS Proxy" component interfacing with other components (for the DNS function of the previous work) takes responsibility of those actions.

Below is described a method for Application Server discovery for Edge Computing in Mobile Networks that allows applications to use DNS as the mechanism for AS discovery, and Operators to use dynamic UL CL insertion for efficient steering of Application traffic to a local data network.

Building a Translation Table From an Off-line SLA

It is assumed that an agreement is in place between the Mobile Network Operator (MNO) and the Service Provider for the application(s) and leverages the ECS option defined in RFC 7871. As part of the agreement, the Service provider shares with the MNO the following elements: the Application(s) FQDS(s) that will be used by Application clients to discover the Application Server using DNS; the location(s) of edge site(s) at which the edge AS(s) for each Application are placed ("AS Site" from now on); and the IP address ranges that are used by the ASs at each "AS Site".

This information as well as the MNO network topology information is used by the MNO to produce a Translation Table that maps a given user location and application into the preferred PDU session anchor(s) (PSA(s)), including information of corresponding subnet (or full IP address) of that N6 access to the DN after IP address Network Translator (NAT). Note that this replaces the DNS proxy function presented in the previous work, where the DNS proxy maps the UE location to the local DNS server address to forward the DNS request to.

Also, from the AS address received in the DNS response is derived the IP address range that should be configured in the UL CL traffic steering. By default, the returned AS address may be used to identify the IP address ranges that may be used by the UE in the communication with the AS(s) and to be configured in the UL CL.

The Operator deploys a new DNS component. That component is from now on referred to as DNS Proxy, and deployment examples would be to have it as a standalone network entity, or deployed in the UPF or in the MNO DNS (as will be detailed further below).

The Translation Table described above is deployed in the DNS component from now on referred to as DNS Proxy.

The solution addresses the issue of Discovery of Edge Application Server in TR 23.748. The UE is Edge Computing Service agnostic.

The Operator deploys a new DNS component. That component is from now on referred to as DNS Proxy, and it is deployed in the MNO network before the NAT.

The DNS Proxy deploys a Translation Table that maps a given user location and application into the preferred PDU session anchor(s) (PSA(s)), including information of corresponding subnet (or full IP address) of that N6 access to the DN after NAT. It also includes IP address ranges that may be used by the UE in the communication with the AS(s) and to be configured in the UL CL. It may also include a list of FQDNs for the services that are allowed for edge computing.

The DNS proxy is involved in the DNS communication of the UEs authorized for edge services, e.g., at session establishment the SMF sends the DNS Proxy address to use to the UE (in the PCO field). The DNS Proxy receives the UE DNS request for an FQDN related to an Edge AS, authorizes the UE/service and determines first at least one suitable local PDU session anchor (PSA) point for that UE location and application. The Mobile Core assists then the discovery of most suitable Application Server for that PSA(s) by adding the PSA network location(s) as ECS option(s) to the DNS request. At that stage, it is up to the Service Provider to select an EAS that matches that suggestion. The Service Provider may feed information back to the Mobile Network on whether the selection has been tailored to the information provided, by using the ECS option. The Mobile Core then inserts the UL CL and sets up the traffic steering accordingly.

Figure 5:
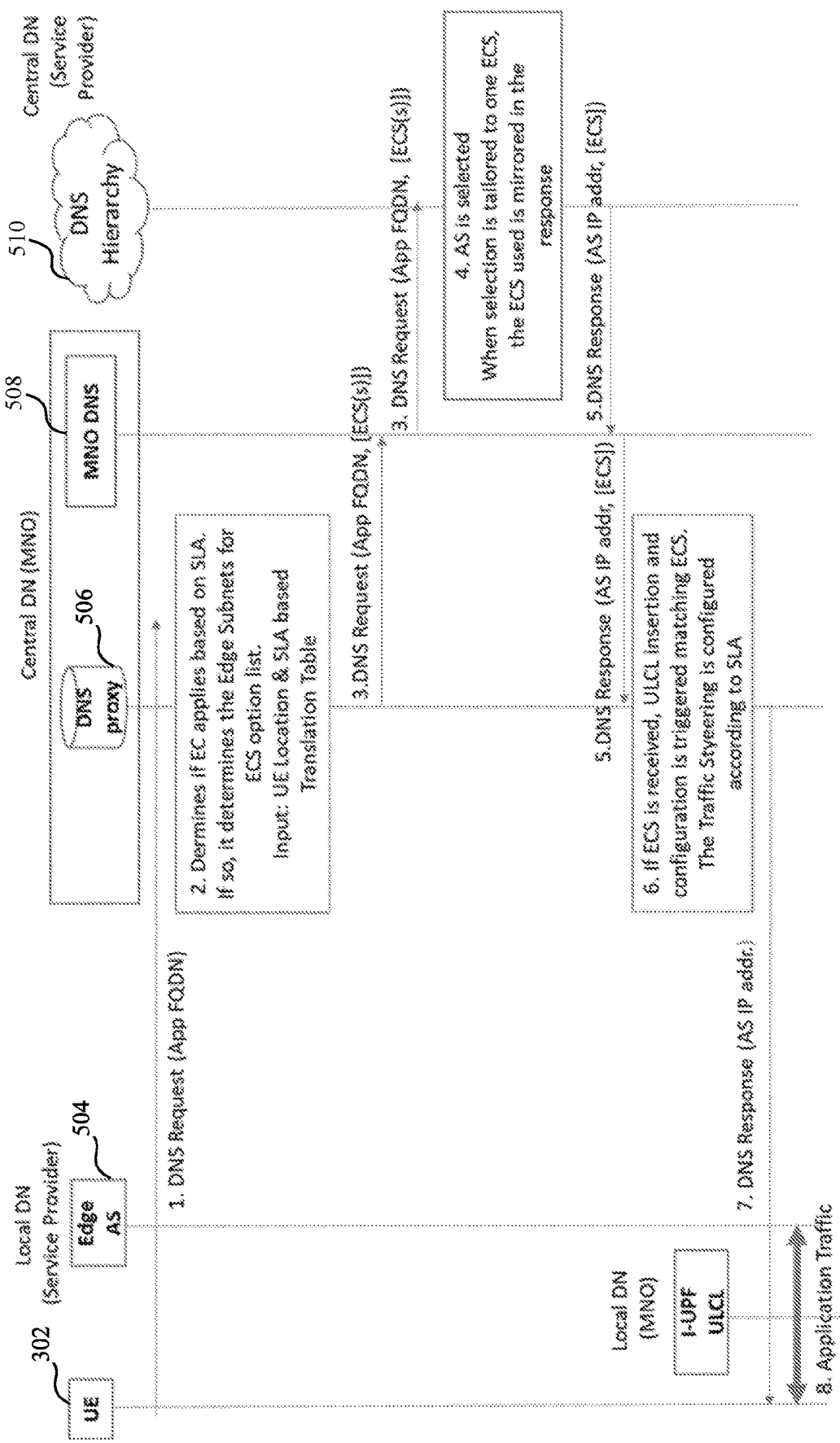
FIG. 5 is a schematic illustration Edge AS Discovery and dynamic UL CL Insertion based on enhanced MNO/Service provider Collaboration.

FIG. 5 illustrates an example sequence for this method that includes the following steps.

When the UE 302 sets up a PDU session, 5G Core existing mechanisms are used to guarantee that, if for that user PDU session Edge Computing can be applied, the UE DNS queries are sent to the DNS Proxy 506. This can be done, for example, including the DNS Proxy address in the PCO field to the UE at session establishment. Otherwise, the MNO DNS address may be provided instead, and the DNS Proxy may be skipped.

Step 1, once the PDU Session has been established, an application may want to setup a connection to an edge Application Server 504. Typically, the Application Server is known by a domain name, and so that needs to be translated into an IP address. UE 302 sends a DNS Query with the Application FQDN. That query is sent to the DNS Proxy 506 if, for that user, PDU session Edge Computing can be applied.

Step 2, the DNS Proxy 506 checks whether there is an SLA in place for that application. To do that, it looks for the Application FQDN received in the DNS Query in the SLA based Translation Table.

If there is no match, there is no agreement, and the DNS proxy 506 forwards the DNS request to the MNO DNS 508 which resolves that as usual.

If there is a match, the DNS Proxy 506 retrieves the User Location from the Control Plane by using e.g., the exposure APIs.

As an alternative, if it is deployed in the UPF, it derives the location down to Access Node level from the N3 Session information. This will be explained in more details further below.

With the UE Location and the FQDN, the DNS Proxy 506 obtains the preferred locations for the N6 Access to the DN for that application and the corresponding subnets (or full IP addresses) after NAT using the SLA based Translation Table. These subnet(s) (or full IP addresses) are then added as one or more "ECS" options in the DNS Query as in RFC 7871. ECS stands for EDNS Client Subnet, where EDNS is Extension Mechanisms for DNS. The query is then forwarded to the MNO DNS. The original DNS request by the UE is temporarily buffered to make it possible to be resent e.g., in failure cases.

Any ECS received from the stub resolver in the UE is not considered, as in this solution, it is not the client address but network addresses that are provided in the ECS.

Step 3, the DNS request is forwarded to the MNO DNS 508. MNO DNS resolves the DNS query as usual and the DNS Query reaches the DNS Hierarchy 510.

Step 4, the ECS option(s) in the DNS Query can be used by the Service Provider DNS to tailor the DNS response. When that is done, and if the Application Server selection has been tailored to one of the ECS option(s) in the query (i.e. the AS is selected to be topologically close to the ADDRESS in one ECS option), then one ECS option is sent in the response. It corresponds to the ECS option in the query that the DNS response has been tailored to. The ECS option in the response is built according to RFC 7871: FAMILY, SOURCE PREFIX-LENGTH, and ADDRESS are copies from the ECS option in the query; SCOPE PREFIX LENGTH can be set for example to 0 so no caching is done.

Else, even if the ECS option(s) have been considered, the response is not tailored to any of them, no ECS option is sent back in the response.

Step 5, the DNS response is sent, and reaches the MNO DNS 508, that sends it back to the DNS Proxy 506, that acted as forwarder. Note that it is assumed that the DNS response always includes an EAS address. That is, if an iterative DNS resolution is used, this always happens above the DNS proxy. This is needed in order to convey the necessary information about the selected EAS address as well as possible ECS information to the DNS proxy.

Step 6, the DNS Proxy 506 checks the response and whether that includes an ECS Option. If so, it selects one PSA that corresponds to the received ECS (e.g. one PSA that supports that N6 access to the DN) and uses the AS address received to determine the AS site selected and applicable AS IP ranges.

The DNS Proxy uses the 3GPP Exposure APIs to Update the CP Policies to request UL CL Insertion, and to configure traffic steering for the selected AS IP ranges to the selected PSA anchor. The traffic steering itself may be done by existing mechanisms defined in 3GPP.

Alternatively, the DNS Proxy may determine the DNAI that corresponds to the received ECS (that is, the Identifier of that N6 access to the DN) and use the AS address received to determine the AS site selected and applicable AS IP ranges.

The DNS Proxy uses the 3GPP Policy Authorization Service (3GPP TS 23.514 v 16.2.0.0. 5G System; Policy Authorization Service; Stage 3; Release 16) to request an Update of the content provider (CP) Policies for steering of certain traffic to a local access of the DN. As a result, SMF inserts an UL CL, and configures the traffic steering for the selected AS IP ranges to the selected N6 access to the DN (that is, according to the DNAI).

Alternatively, if the DNS proxy is deployed in the UPF, traffic steering may be done by a proprietary method involving N4 traffic forwarding to the SMF.

Step 7, the DNS Response is sent to the UE 302 once those actions have been completed (the ECS option is removed before).

Step 8, the application traffic starts towards the IP Address received. That traffic is diverted by the UL CL and sent via the selected PSA to the N6 access to the DN that is topologically close to the AS (assuming the Service Provider selection was correct).

The procedure above assumes that the setup of traffic steering based on the received DNS response was successful. The DNS Proxy starts a timer after the initiation of the traffic steering in Step 6 waiting for notification for the SMF of the changes of the user plane for the given session. If no notification is received before the timer expires then it is considered that the Dynamic UL CL insertion and configuration in step 6 above has failed for causes related to the specific N6 access location selected, then e.g. a new request could be sent with ECS(s) but excluding that specific N6 access location. The process above would repeat from step 3. The DNS Proxy could log the event.

If Dynamic UL CL insertion and configuration in step 6 fails as an alternative, e.g. the process above would repeat from step 3 without sending the ECS Option. The DNS Proxy could log the event.

As an alternative to the procedure described in FIG. 5, in Step 3 the DNS Proxy, based on user location and SLA, may forward the request to a DNS serving the location of the UE. In this case, the response does not include the ECS. The DNS Proxy needs to determine based on the DNS response and the SLA the most suitable local PSA and then proceeds as from Step 6 in FIG. 5.

DNS Proxy Deployment Options

There are different options for the deployment of the DNS proxy. The solution as described can be used independently on where the DNS Proxy is deployed. As examples, it could be deployed standalone, in UPF or in DNS.

Still, some specifics can be applied in some cases:

Stand-alone deployment. The solution has no impact on existing 5th Generation Core Network (5GC) procedures. The DNS Proxy acts as an MNO internal AF and uses available 5GC APIs to communicate with the CN entities to authenticate UEs/services, to infer UE location and to trigger traffic steering, as defined e.g., in 3GPP TS 23.502, clauses 4.3.6.4 and 4.3.6.3.

Deployed as part of the MNO DNS. The advantage of such a scheme is that the DNS resolution steps (number of hops) are decreased, resulting in faster DNS processing with lower processing needs.

Figure 6:
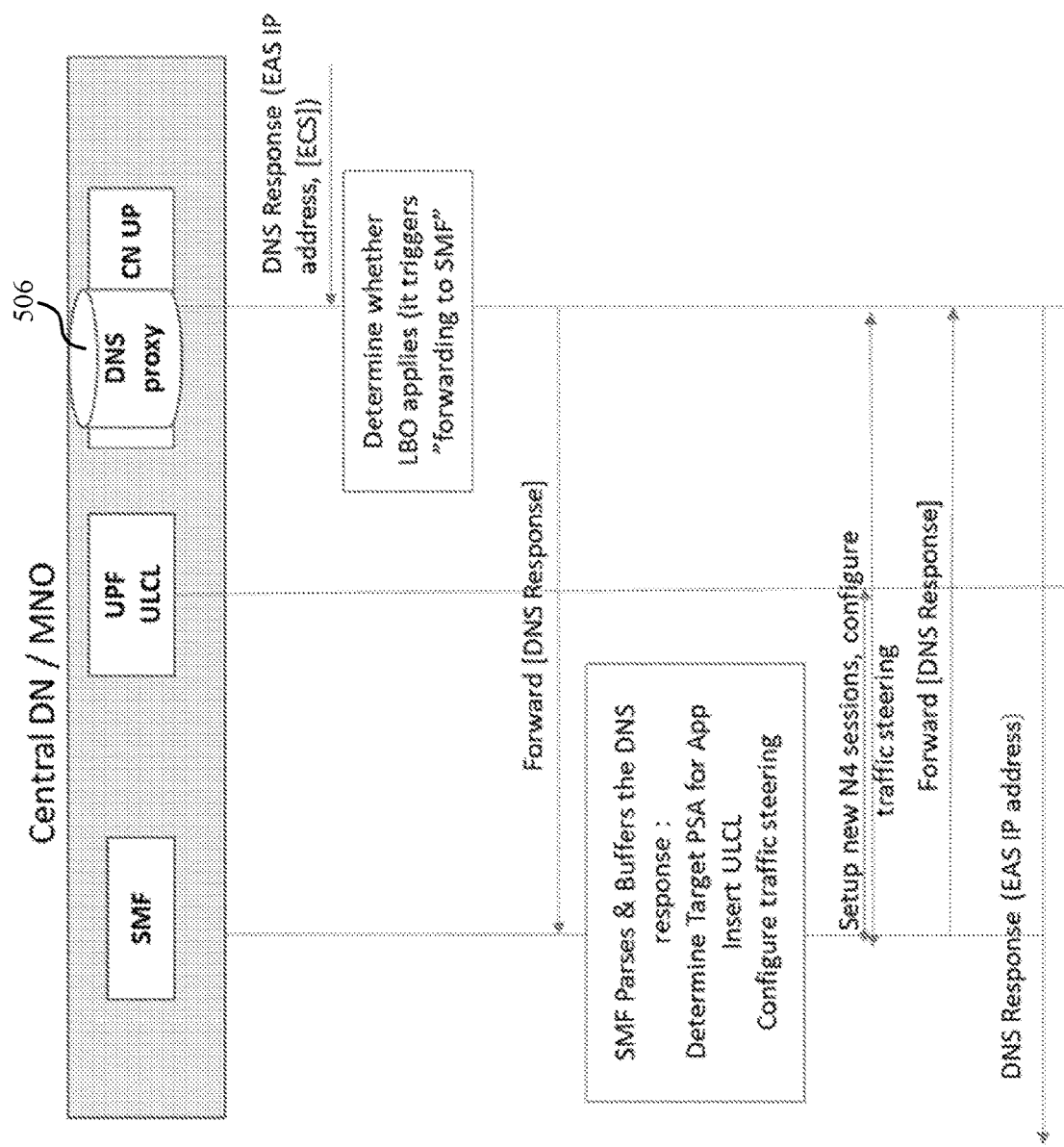
FIG. 6 is a schematic illustration Configuring traffic steering when the DNS Proxy is deployed as part of the UPF.

Deployed as part of the UPF. This scenario has also some advantages. For example, in FIG. 5 step 2, the UE location needed to select the preferred location of the N6 access to the DN may be directly available (the Access Node Id could be derived from the GTP tunnel Id). The SLA based Translation Table would then need to be based on that location granularity. Another property of this solution is that the request to SMF communication for UL CL/PSA insertion and traffic steering configuration in FIG. 5, Step 6, may be based on N4 data forwarding to SMF, as shown in FIG. 6.

Sending Multiple Candidate IP Address Ranges (of N6 Accesses)

In some cases, sending just one IP address range in an ECS option may not convey enough information related to the selectable N6 accesses by the service provider. For example: non-uniform AS deployment could result in AS-es co-sited with an N6 access that is not the currently closest to the UE when AS deployment information is missing or is outdated; the AS(es) 'close' to the proposed N6 location are overloaded/failed (or the transport towards them does not provide the required KPI) but other AS(es) would still be available at other N6 accesses with the required characteristics; there would be a more optimal non-closest AS to use that still fulfills the latency requirement, but that has more processing resources or is of lower cost provided it uses another N6 access.

The solution to the above problem is that the DNS Proxy provides a list of ECS options (with option code 8) listing them e.g., in the order of preference of the MNO, e.g. based on how far on the topology a certain N6 access is from the UE. The response from service provider then includes the ECS address and scope prefix-length for the ECS address that the EAS selection was based on.

MNO preference order allows for only qualitative differentiation of the available N6 accesses by the service provider. Further enhancements enabling for quantitative differentiation are also possible, e.g., by defining new DNS options carrying additional information, e.g., topological distance from the UE to a candidate N6 access.

DNS Proxy Functionality

Figure 7:
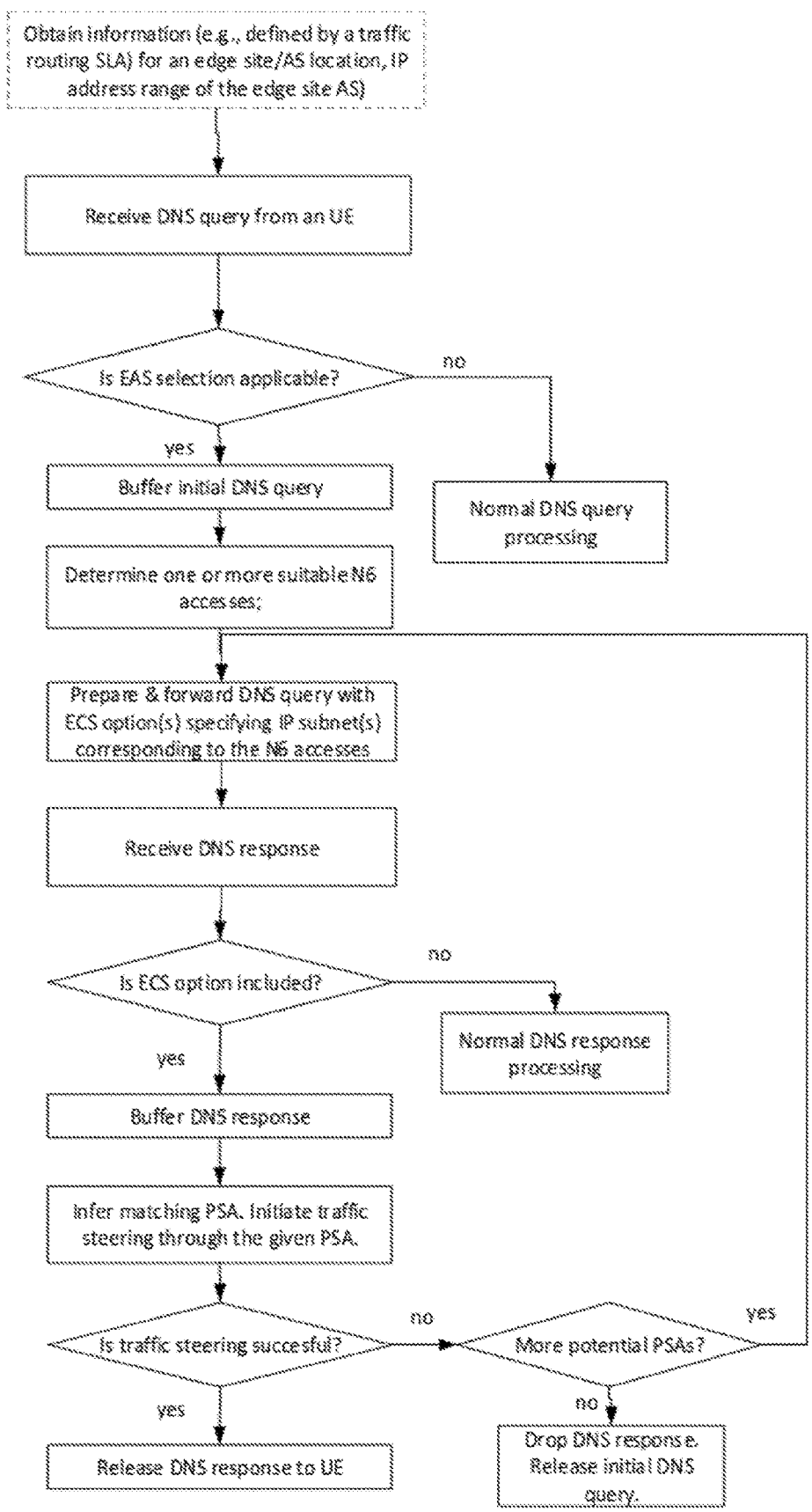
FIG. 7 is a flowchart showing a DNS Proxy functionality.

The DNS proxy functionality proposed is shown in FIG. 7. The same explanation applies for the different steps as in the previous description.

This is a solution for Application Server discovery for Edge Computing in Mobile Networks that allows applications to continue to use DNS as the mechanism for EAS discovery, and Operators to use dynamic UL CL insertion for efficient steering of Application traffic to a local data network.

This solution is simpler compared to previous work and puts the responsibility on the Service provider instead to accept or not the proposed location for the N6 access to the Data Network, and if so, select the most suitable EAS for that. It simplifies the logic in the Mobile Core, which does not need to verify the answer and calculate the closest PDU session anchor point. Still the coordination between EAS selection and anchor is guaranteed. It simplifies the deployment. Local DNSs that can handle the DNS queries at each site are not needed. It enables providing additional topology information by sending multiple of these N6 access locations for application selection, which can result in selecting a more suitable EAS and UL CL/PSA pair for the UE traffic. It is more robust, as it has a fall back mechanism if for some reason the Traffic steering and routing cannot be set to match the ECS based EAS selection.

Figure 8A:
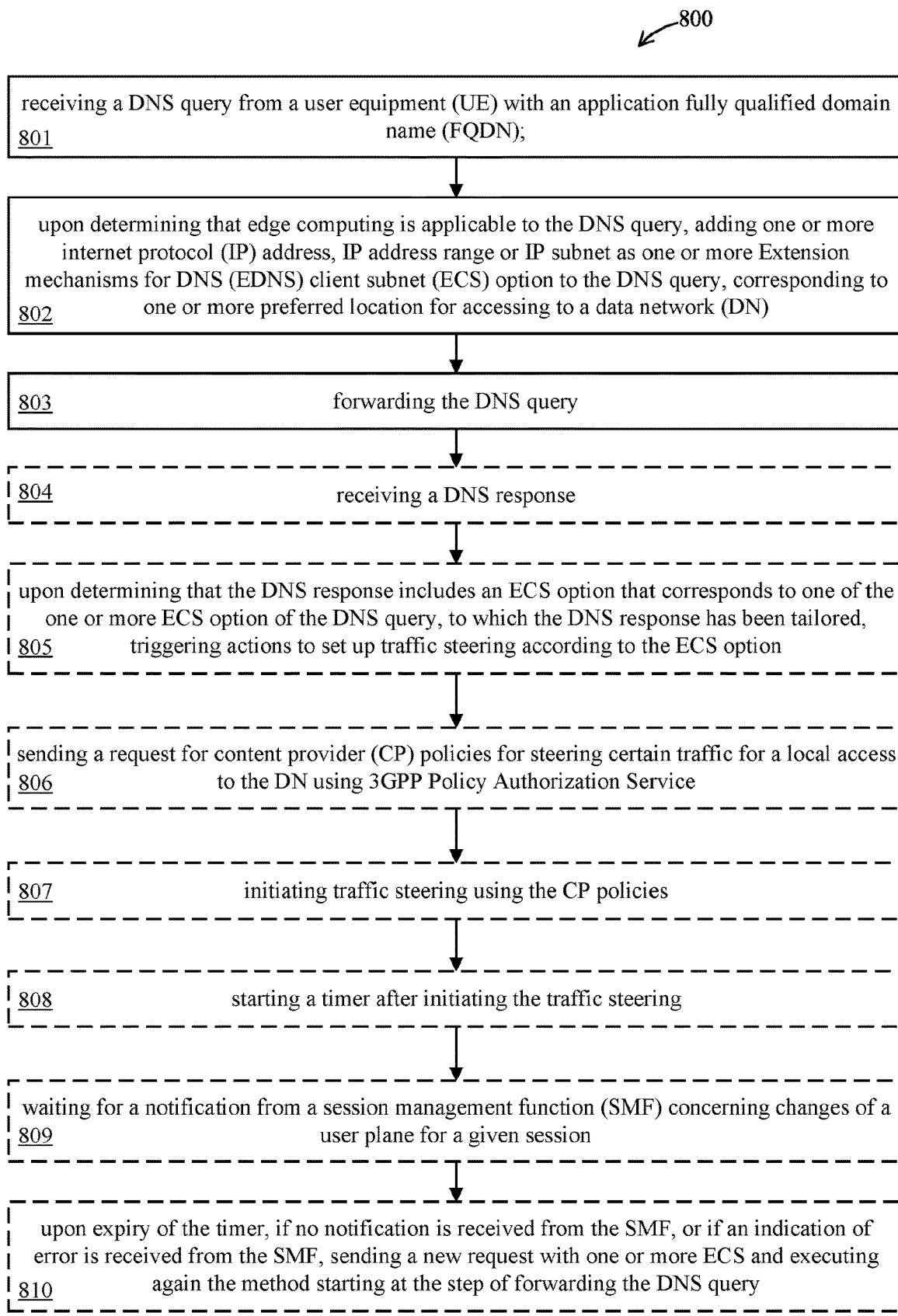
FIG. 8a is a flowchart of a method executed in a domain name system (DNS) proxy for identification of traffic suitable for edge breakout and for traffic steering in a mobile network.

FIG. 8a illustrates a method 800 executed in a domain name system (DNS) proxy 506 for identification of traffic suitable for edge breakout and for traffic steering in a mobile network, comprising: receiving, step 801, a DNS query from a user equipment (UE) with an application fully qualified domain name (FQDN); upon determining, step 802, that edge computing is applicable to the DNS query, adding one or more internet protocol (IP) address, IP address range or IP subnet as one or more Extension mechanisms for DNS (EDNS) client subnet (ECS) option to the DNS query, corresponding to one or more preferred location for accessing to a data network (DN); and forwarding, step 803, the DNS query. In this context, an IP subnet is a subset of the IP address, i.e. some of the bits of the IP address, starting at the beginning of the address at the most significant bits (MSB). When the DNS query is forwarded, it is forwarded to the next DNS in the architecture. It may be forwarded to a dedicated forwarder for addresses that are outside the network.

The method may further comprise: receiving, step 804, a DNS response; and upon determining, step 805, that the DNS response includes an ECS option that corresponds to one of the one or more ECS option of the DNS query, to which the DNS response has been tailored, triggering actions to set up traffic steering according to the ECS option.

Tailoring in this context may mean adapting according to policies. The DNS server looks at ECS options and if it has a functionality to respond differently depending on the value of the ECS option, the response is tailored/adapted according to policies for how to handle addresses in the ECS option. Different responses can be obtained depending on the content.

The method may further comprise, upon successful completion of the actions triggered to set up the traffic steering, removing the ECS option from the DNS response and sending the DNS response to the UE.

The method may further comprise, upon unsuccessful completion or failure of the actions triggered to set up the traffic steering, forwarding the DNS query again and excluding the ECS option that has generated the unsuccessful completion or failure.

The method may further comprise, upon unsuccessful completion or failure of the actions triggered to set up the traffic steering, forwarding the DNS query again without ECS options.

Different branches of the method may be executed according to preferences set in a service level agreement (SLA) based translation table or based upon a predefined configuration.

Determining that edge computing is applicable to the DNS query may further comprise determining whether a DNS query FQDN is under service level agreement (SLA).

Determining whether the DNS query FQDN is under SLA may further comprise determining whether the DNS query FQDN is included in an SLA based translation table.

The one or more preferred location for accessing to the DN may be extracted from the SLA Based Translation table, using as inputs for reading the SLA Based Translation table at least the DNS query FQDN and a user location.

Preferred location is a location of access to the data network. The IP network topology may be used to determine this location of the application server i.e. how close it is IP routing wise. Extracting data from the SLA based translation table may be done using keys. For example, the user (geographic) location and application defined by FQDN can be used as keys to obtain the preferred location. For a given application it translates a user location into a list of preferred locations for accessing the DN.

The method may further comprise getting the user location from a policy control function (PCF) through existing exposure Application Programming Interfaces (APIs).

The one or more IP address, IP address range or IP subnet to include in the ECS of the DNS query may correspond to the one or more preferred location for accessing to the DN. This could be an output of the SLA based translation table or it could be based upon a predefined configuration.

Forwarding the DNS query may comprise forwarding the DNS query to a next DNS in a DNS hierarchy, or to a dedicated forwarder. The DNS proxy may redirect traffic to different DNS servers depending on the location; then it gets different responses and looks at the responses to be able to understand if/what edge breakout can be done. When the DNS query is forwarded to a DNS forwarder the system uses a recursive mode of operation.

The method may further comprise determining a DN access identifier (DNAI) that corresponds to the ECS option in the DNS response.

A service level agreement (SLA) based translation table or a predefined configuration may be used for determining the DNAI.

The method may further comprise determining application server (AS) IP addresses ranges based on an AS address included in the DNS response. To handle the "AS site" concept as such is not necessarily needed as long as all the AS IP ranges which are relevant for a given AS selection (the one in the DNS response) are known. AS Site is one way to group them: all IP addresses that are relevant for application traffic steering purposes. These IP addresses could be used as destination IP by the Application client at some point, still within the same AS site.

This information is part of what the Application/service providers gives to the MNO as part of the SLA The method may further comprise requesting set up of traffic steering from a policy control function (PCF) by sending a request including the DNAI and the AS IP addresses ranges.

The actions may include any one or more of: sending, step 806, a request for content provider (CP) policies for steering certain traffic for a local access to the DN using 3GPP Policy Authorization Service; initiating, step 807, traffic steering using the CP policies; starting, step 808, a timer after initiating the traffic steering; waiting, step 809, for a notification from a session management function (SMF) concerning changes of a user plane for a given session; and upon expiry of the timer, if no notification is received from the SMF, or if an indication of error is received from the SMF, sending, step 810, a new request with one or more ECS and executing again the method starting at the step of forwarding the DNS query.

The DNS queries from UEs of users authorized to use edge computing may be sent to the DNS proxy, when enabled, through user subscription information.

A service level agreement (SLA) based translation table may be deployed in the DNS proxy and may comprise:

operator locations for accessing to the DN, at least one SLA agreement including applications FQDNs, and AS deployments and application server (AS) IP ranges at each AS site.

Forwarding the DNS query may comprise forwarding the DNS query to a mobile network operator (MNO) DNS, the DNS request received from the UE being temporarily buffered to be forwarded again in case of failure.

The ECS option in the DNS response may be built according to RFC 7871, which includes FAMILY, SOURCE PREFIX-LENGTH, and ADDRESS, which are copies from the ECS option in the DNS query; wherein if SCOPE PREFIX LENGTH is set to 0, no caching is done.

Figure 8B:
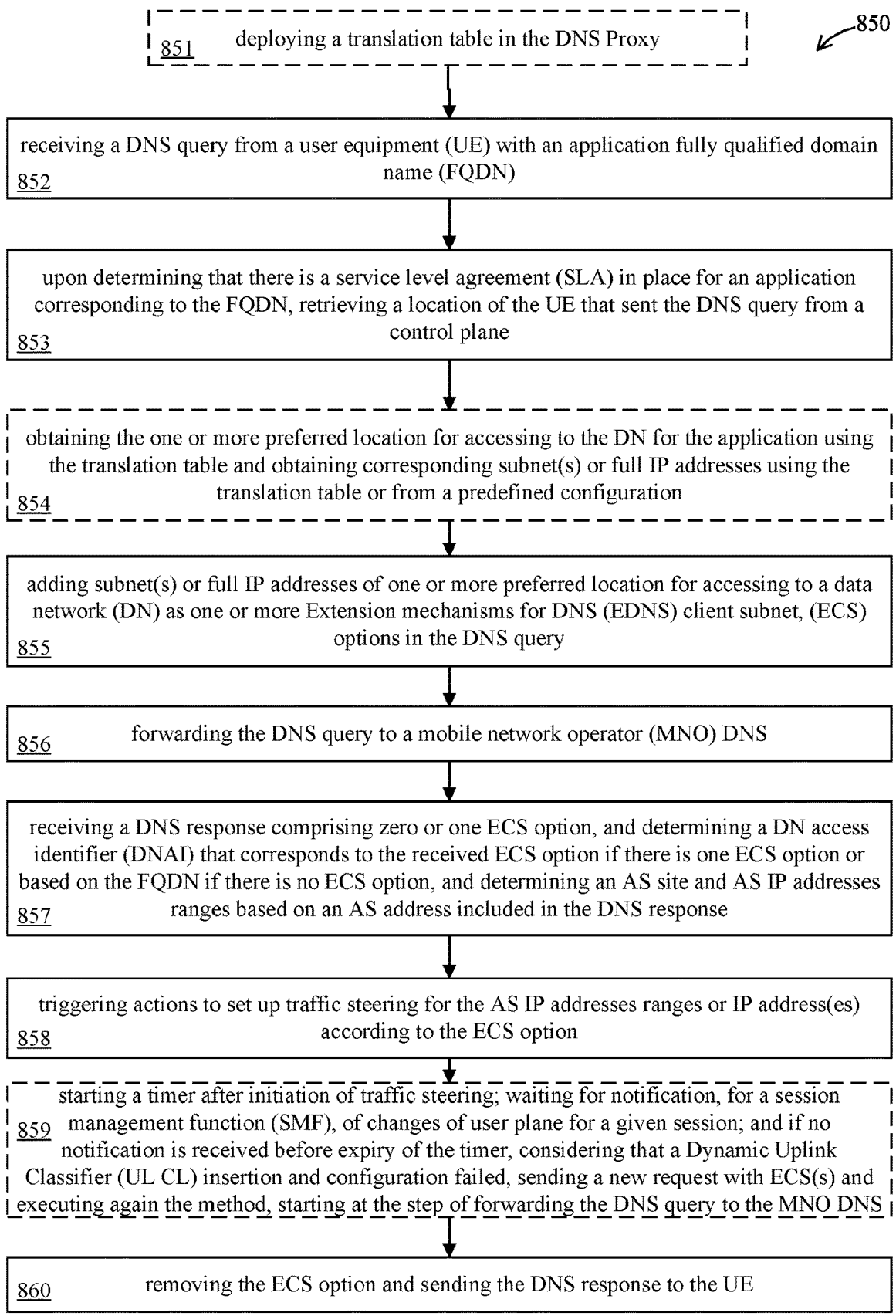
FIG. 8b is a flowchart of a method executed in a domain name system (DNS) proxy for application server (AS) discovery for edge computing in a mobile network.

FIG. 8b illustrates a method 850 executed in a domain name system (DNS) proxy 506 for application server (AS) discovery and traffic steering for edge computing in a mobile network. The method comprises receiving, step 852, a DNS query from a user equipment (UE) with an application fully qualified domain name (FQDN). The method comprises, upon determining, step 853, that there is a service level agreement (SLA) in place for an application corresponding to the FQDN, retrieving or obtaining a location of the UE that sent the DNS query from a control plane. The method comprises adding, step 855, subnet(s) or full IP addresses of one or more preferred location for accessing to a data network (DN) as one or more Extension mechanisms for DNS (EDNS) client subnet, (ECS) options in the DNS query. The method comprises forwarding, step 856, the DNS query to a mobile network operator (MNO) DNS. The method comprises receiving, step 857, a DNS response comprising zero or one ECS option, wherein when there is an ECS option, the ECS option may correspond to the ECS option in the DNS query that the DNS response has been tailored to and when there is no ECS option, the DNS response is not tailored to any ECS option. The method comprises triggering actions to set up, or requesting, step 858, traffic steering according to the ECS option. The method comprises removing, step 860, the ECS option and sending the DNS response to the UE.

The method may further comprise: deploying, step 851, a translation table in the DNS Proxy; and obtaining, step 854, the one or more preferred location for accessing to the DN for the application using the translation table and obtaining corresponding subnet(s) or full IP addresses using the translation table or from a predefined configuration; and determining a DN access identifier (DNAI) that corresponds to the received ECS option, and determining application server (AS) IP addresses ranges based on an AS address included in the DNS response.

The translation table may be an SLA based translation table that maps a given user location and the application into the one or more preferred location for accessing to the DN.

Obtaining may include looking for the application FQDN received in the DNS Query in the translation table.

When there is an SLA in place, a user location may be retrieved from the control plane by using exposure Application Programming Interfaces (APIs).

When forwarding the DNS query to the MNO DNS, the DNS request received from the UE may be temporarily buffered to be forwarded again in case of failure.

The ECS option in the DNS response may be built according to RFC 7871, which includes FAMILY, SOURCE PREFIX-LENGTH, and ADDRESS fields, which are copies from the ECS option in the DNS query; and if a SCOPE PREFIX LENGTH is set to 0, no caching is done.

The method may further comprise starting, step 859, a timer after initiation of traffic steering; waiting for notification, for a session management function (SMF), of changes of user plane for a given session; and if no notification is received before expiry of the timer, considering that a Dynamic UL CL insertion and configuration failed, sending a new request with ECS(s) and executing again the method, starting at the step of forwarding the DNS query to the MNO DNS.

The DNS proxy may be deployed as a standalone entity, in UPF or in MNO DNS.

Figure 8C:
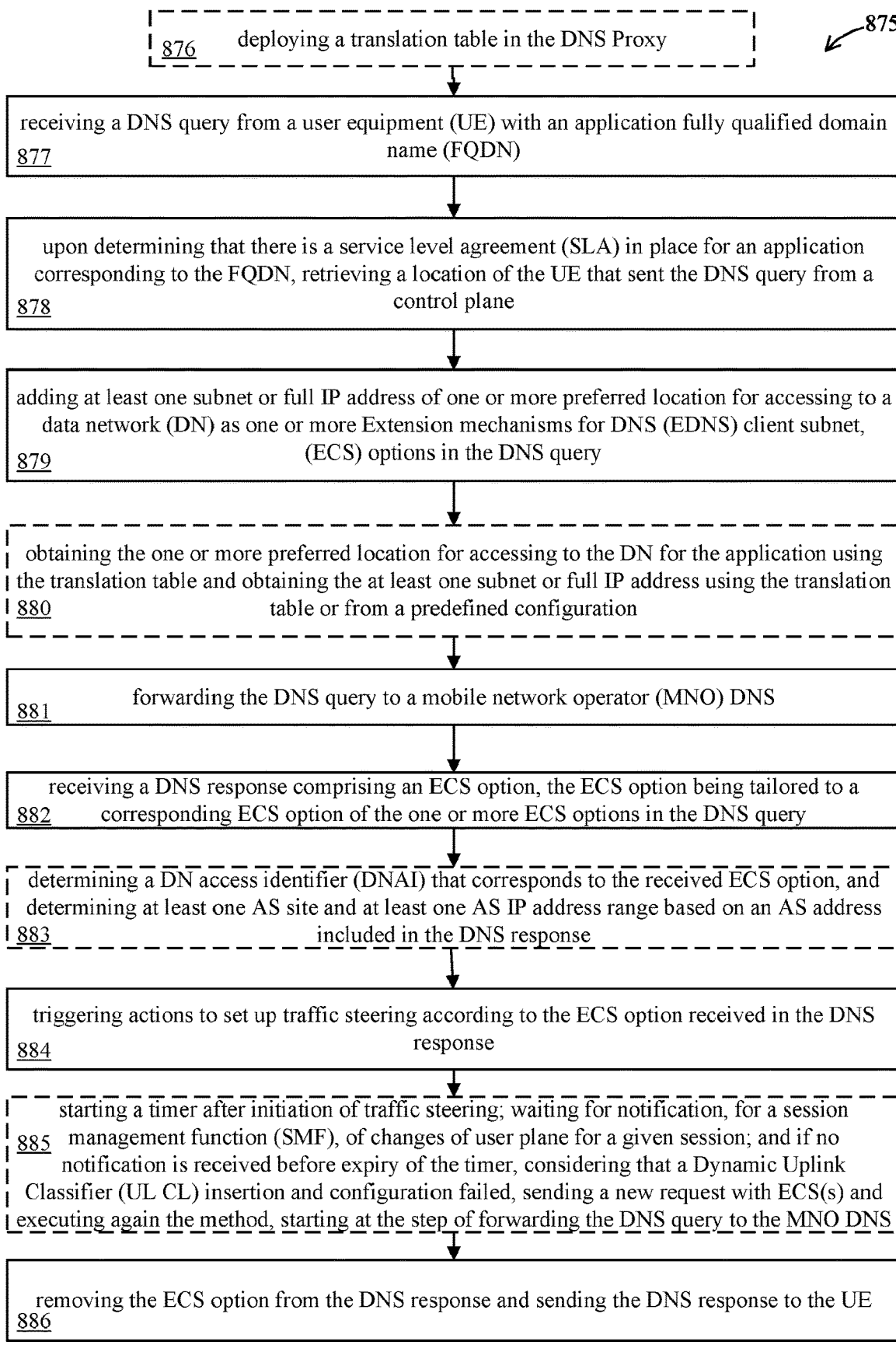
FIG. 8c is another flowchart of a method executed in a domain name system (DNS) proxy for application server (AS) discovery for edge computing in a mobile network.

FIG. 8c illustrates a slightly simplified version of the method of FIG. 8b. Method 875 is executed in a domain name system (DNS) proxy 506 for application server (AS) discovery and traffic steering for edge computing in a mobile network. The method comprises receiving, step 877, a DNS query from a user equipment (UE) with an application fully qualified domain name (FQDN). The method comprises, upon determining, step 878, that there is a service level agreement (SLA) in place for an application corresponding to the FQDN, obtaining a location of the UE that sent the DNS query from a control plane. The method comprises adding, step 879, at least one subnet or full IP address of one or more preferred location for accessing to a data network (DN) as one or more Extension mechanisms for DNS (EDNS) client subnet (ECS) options in the DNS query. The method comprises forwarding, step 881, the DNS query to a mobile network operator (MNO) DNS. The method comprises receiving, step 882, a DNS response comprising an ECS option, the ECS option being tailored to a corresponding ECS option of the one or more ECS options in the DNS query. The method comprises triggering actions, step 884, to set up traffic steering according to the ECS option received in the DNS response. The method comprises removing, step 886, the ECS option from the DNS response and sending the DNS response to the UE.

The method may further comprise: deploying, step 876, a translation table in the DNS Proxy; and obtaining, step 880, the one or more preferred location for accessing to the DN for the application using the translation table and obtaining the at least one subnet or full IP address using the translation table or from a predefined configuration. The method may further comprise determining, step 883, a DN access identifier (DNAI) that corresponds to the received ECS option, and determining at least one application server (AS) site and at least one IP address range based on an AS address included in the DNS response.

The translation table may be an SLA based translation table that maps a given user location and the application into the one or more preferred location for accessing to the DN.

Obtaining may include looking for the application FQDN received in the DNS Query in the translation table.

When there is an SLA in place, a user location may be retrieved from the control plane by using exposure Application Programming Interfaces (APIs).

When forwarding the DNS query to the MNO DNS, the DNS request received from the UE may be temporarily buffered to be forwarded again in case of failure.

The ECS option in the DNS response may be built according to RFC 7871, which includes FAMILY, SOURCE PREFIX-LENGTH, and ADDRESS fields, which are copies from the ECS option in the DNS query; and if a SCOPE PREFIX LENGTH is set to 0, no caching is done.

The method may further comprise starting, step 885, a timer after initiation of traffic steering; waiting for notification, for a session management function (SMF), of changes of user plane for a given session; and if no notification is received before expiry of the timer, considering that a Dynamic Uplink Classifier (UL CL) insertion and configuration failed, sending a new request with ECS(s) and executing again the method, starting at the step of forwarding the DNS query to the MNO DNS.

The DNS proxy may be deployed as a standalone entity, in UPF or in MNO DNS.

Figure 9:
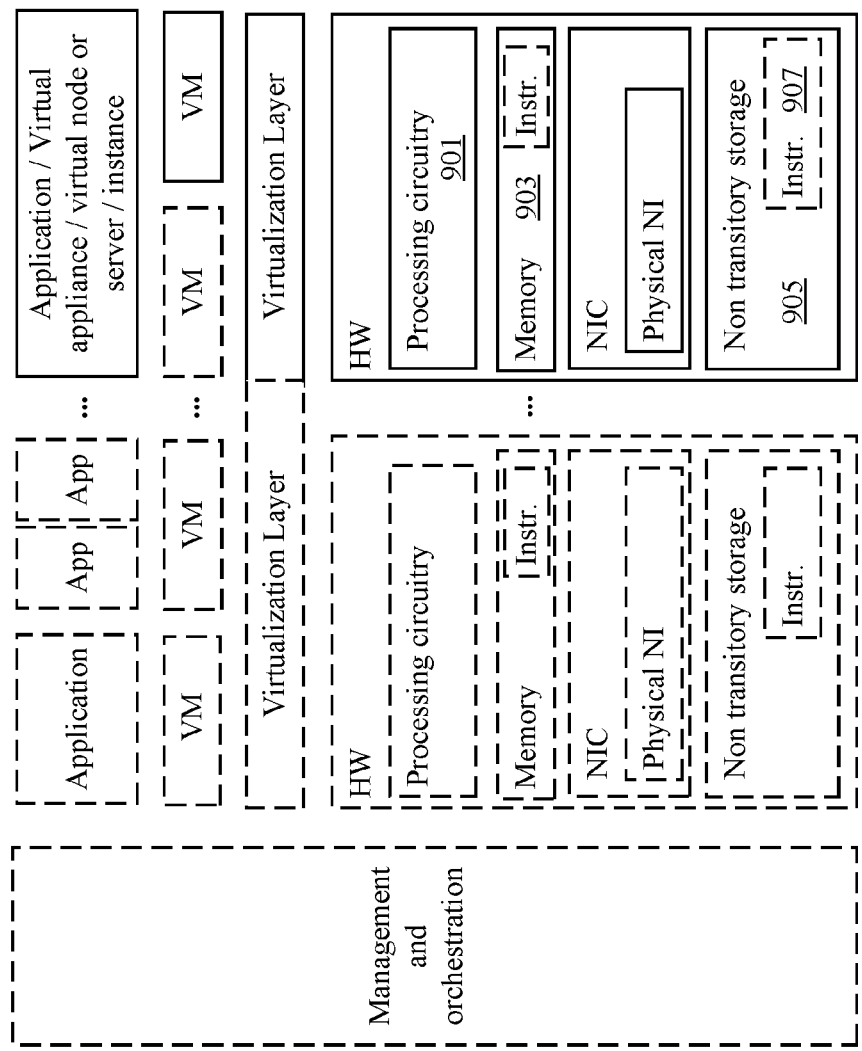
FIG. 9 is a schematic illustration of a virtualization environment in which the different method(s) and apparatus (es) described herein can be deployed.

Referring to FIG. 9, there is provided a virtualization environment in which functions and steps described herein can be implemented.

A virtualization environment (which may go beyond what is illustrated in FIG. 9), may comprise systems, networks, servers, nodes, devices, etc., that are in communication with each other either through wire or wirelessly. Some or all of the functions and steps described herein may be implemented as one or more virtual components (e.g., via one or more applications, components, functions, virtual machines or containers, etc.) executing on one or more physical apparatus in one or more networks, systems, environment, etc.

A virtualization environment provides hardware comprising processing circuitry 901 and memory 903. The memory can contain instructions executable by the processing circuitry whereby functions and steps described herein may be executed to provide any of the relevant features and benefits disclosed herein.

The hardware may also include non-transitory, persistent, machine readable storage media 905 having stored therein software and/or instruction 907 executable by processing circuitry to execute functions and steps described herein.

The apparatus (e.g. HW in FIG. 9) or system (e.g. system of FIG. 9) comprises processing circuits 901 and a memory 903, 905, the memory containing instructions executable by the processing circuits whereby the apparatus is operative to execute any of the steps described herein.

There is provided an apparatus or system, for identification of traffic suitable for edge breakout and for traffic steering in a mobile network comprising processing circuits 901 and a memory 903, 905, the memory containing instructions executable by the processing circuits whereby the apparatus or system is operative to execute any of the steps described herein.

There is provided a domain name system (DNS) proxy (may be executed as an application, virtual node, instance, as illustrated in FIG. 9) for identification of traffic suitable for edge breakout and for traffic steering in a mobile network operative to execute any of the steps described herein.

There is provided an apparatus or system, for application server (AS) discovery for edge computing in a mobile network comprising processing circuits 901 and a memory 903, 905, the memory containing instructions executable by the processing circuits whereby the apparatus or system is operative to execute any of the steps described herein.

There is provided a domain name system (DNS) proxy (may be executed as an application, virtual node, instance, as illustrated in FIG. 9) for application server (AS) discovery for edge computing in a mobile network operative to execute any of the steps described herein.

The non-transitory computer readable media 905 has stored thereon instructions 907 for executing any of the steps of the methods described herein.

Modifications will come to mind to one skilled in the art having the benefit of the teachings presented in the foregoing description and the associated drawings. Therefore, it is to be understood that modifications, such as specific forms other than those described above, are intended to be included within the scope of this disclosure. The previous description is merely illustrative and should not be considered restrictive in any way. The scope sought is given by the appended claims, rather than the preceding description, and all variations and equivalents that fall within the range of the claims are intended to be embraced therein. Although specific terms may be employed herein, they are used in a generic and descriptive sense only and not for purposes of limitation.

The invention claimed is:

1. A method executed in a domain name system (DNS) proxy for application server (AS) discovery and traffic steering for edge computing in a mobile network, comprising:
   receiving a DNS query from a user equipment (UE) with an application fully qualified domain name (FQDN);
   upon determining that there is a service level agreement (SLA) in place for an application corresponding to the FQDN, obtaining a location of the UE that sent the DNS query from a control plane;
   adding at least one subnet or full IP address of one or more preferred location for accessing to a data network (DN) as one or more Extension mechanisms for DNS (EDNS) client subnet (ECS) options in the DNS query;
   forwarding the DNS query to a mobile network operator (MNO) DNS;
   receiving a DNS response comprising an ECS option, the ECS option being tailored to a corresponding ECS option of the one or more ECS option in the DNS query;
   triggering actions to set up traffic steering according to the ECS option received in the DNS response; and
   removing the ECS option from the DNS response and sending the DNS response to the UE.

2. The method of claim 1, further comprising:
   deploying a translation table in the DNS Proxy;
   obtaining the one or more preferred location for accessing to the DN for the application using the translation table and obtaining the at least one subnet or full IP address using the translation table or from a predefined configuration; and
   determining a DN access identifier (DNAI) that corresponds to the received ECS option, and determining at least one AS site and at least one IP address range based on an AS address included in the DNS response.

3. The method of claim 2, wherein the translation table is an SLA based translation table that maps a given user location and the application into the one or more preferred location for accessing to the DN.

4. The method of claim 2, wherein obtaining includes looking for the application FQDN received in the DNS Query in the translation table.

5. The method of claim 1, wherein, when there is an SLA in place, a user location is retrieved from the control plane by using exposure Application Programming Interfaces (APIs).

6. The method of claim 1, wherein when forwarding the DNS query to the MNO DNS, the DNS request received from the UE is temporarily buffered to be forwarded again in case of failure.

7. The method of claim 1, wherein the ECS option in the DNS response includes FAMILY, SOURCE PREFIX-LENGTH, and ADDRESS fields, which are copies from the ECS option in the DNS query; and wherein if a SCOPE PREFIX LENGTH is set to 0, no caching is done.

8. The method of claim 1, further comprising starting a timer after initiation of traffic steering; waiting for notification, for a session management function (SMF), of changes of user plane for a given session; and if no notification is received before expiry of the timer, considering that a Dynamic Uplink Classifier (UL CL) insertion and configuration failed, sending a new request with ECS(s) and executing again the method, starting at the step of forwarding the DNS query to the MNO DNS.

9. The method of claim 1, wherein the DNS proxy is deployed as a standalone entity, is deployed in one of a User Plane Function (UPF) and the MNO DNS.

10. A method executed in a domain name system (DNS) proxy for identification of traffic suitable for edge breakout and for traffic steering in a mobile network, comprising:
   receiving a DNS query from a user equipment (UE) with an application fully qualified domain name (FQDN);
   upon determining that edge computing is applicable to the DNS query, adding one or more internet protocol (IP) address, IP address range or IP subnet as one or more Extension mechanisms for DNS (EDNS) client subnet (ECS) option to the DNS query, corresponding to one or more preferred location for accessing to a data network (DN);
   forwarding the DNS query;
   receiving a DNS response;
   upon determining that the received DNS response includes an ECS option that corresponds to one of the one or more ECS option of the DNS query, to which the DNS response has been tailored, triggering actions to set up traffic steering according to the ECS option; and
   upon successful completion of the actions triggered to set up the traffic steering, removing the ECS option from the DNS response and sending the DNS response to the UE.

11. The method of claim 10, further comprising, upon unsuccessful completion or failure of the actions triggered to set up the traffic steering, forwarding the DNS query again and excluding the ECS option that has generated the unsuccessful completion or failure.

12. The method of claim 10, further comprising, upon unsuccessful completion or failure of the actions triggered to set up the traffic steering, forwarding the DNS query again without ECS options.

13. The method of claim 10, wherein determining that edge computing is applicable to the DNS query further comprises determining whether a DNS query FQDN is under service level agreement (SLA).

14. The method of claim 13, wherein determining whether the DNS query FQDN is under SLA comprises determining whether the DNS query FQDN is included in an SLA based translation table.

15. The method of claim 14, wherein the one or more preferred location for accessing to the DN are extracted from the SLA Based Translation table, and further comprising using as inputs for reading the SLA Based Translation table at least the DNS query FQDN and a user location.

16. The method of claim 15, further comprising getting the user location from a policy control function (PCF) through existing exposure Application Programming Interfaces (APIs).

17. The method of claim 15, wherein the one or more IP address, IP address range or IP subnet to include in the ECS of the DNS query correspond to the one or more preferred location for accessing to the DN.

18. The method of claim 10, wherein forwarding the DNS query comprises forwarding the DNS query to a next DNS in a DNS hierarchy, or to a dedicated forwarder.

19. The method of claim 10, further comprising determining a DN access identifier (DNAI) that corresponds to the ECS option in the DNS response.

20. The method of claim 10, further comprising determining application server (AS) IP addresses ranges based on an AS address included in the DNS response.

21. The method of claim 20 further comprising requesting set up of traffic steering from a policy control function (PCF) by sending a request including the DNAI and the AS IP addresses ranges.

22. The method of claim 10, wherein the actions include any one or more of:
   sending a request for content provider (CP) policies for steering certain traffic for a local access to the DN using 3GPP Policy Authorization Service;
   initiating traffic steering using the CP policies;
   starting a timer after initiating the traffic steering;
   waiting for a notification from a session management function (SMF) concerning changes of a user plane for a given session; and
   upon expiry of the timer, if no notification is received from the SMF, or if an indication of error is received from the SMF, sending a new request with one or more ECS and executing again the method starting at the step of forwarding the DNS query.

23. The method of claim 10, wherein a service level agreement (SLA) based translation table is deployed in the DNS proxy and comprises: operator locations for accessing to the DN, at least one SLA agreement including applications FQDNs, and AS deployments and application server (AS) IP ranges at each AS site.

24. The method of claim 10, wherein forwarding the DNS query comprises forwarding the DNS query to a mobile network operator (MNO) DNS, the DNS request received from the UE being temporarily buffered to be forwarded again in case of failure.

25. The method of claim 10, wherein the ECS option in the DNS response includes FAMILY, SOURCE PREFIX-LENGTH, and ADDRESS fields, which are copies from the ECS option in the DNS query; and wherein if a SCOPE PREFIX LENGTH is set to 0, no caching is done.

26. A domain name system (DNS) proxy for application server (AS) discovery for edge computing in a mobile network operative, the DNS proxy comprising processing circuitry configured to:
   receive a DNS query from a user equipment (UE) with an application fully qualified domain name (FQDN);
   upon determining that there is a service level agreement (SLA) in place for an application corresponding to the FQDN, obtain a location of the UE that sent the DNS query from a control plane;
   add at least one subnet or full IP address of one or more preferred location for accessing to a data network (DN) as one or more Extension mechanisms for DNS (EDNS) client subnet (ECS) options in the DNS query;
   forward the DNS query to a mobile network operator (MNO) DNS;
   receive a DNS response comprising an ECS option, the ECS option being tailored to a corresponding ECS option of the one or more ECS option in the DNS query;
   trigger actions to set up traffic steering according to the ECS option received in the DNS response; and
   remove the ECS option from the DNS response and sending the DNS response to the UE.

27. A domain name system (DNS) proxy for identification of traffic suitable for edge breakout and for traffic steering in a mobile network the DNS proxy comprising processing circuitry configured to:
   receive a DNS query from a user equipment (UE) with an application fully qualified domain name (FQDN);
   upon determining that edge computing is applicable to the DNS query, add one or more internet protocol (IP)

address, IP address range or IP subnet as one or more Extension mechanisms for DNS (EDNS) client subnet (ECS) option to the DNS query, corresponding to one or more preferred location for accessing to a data network (DN);

forward the DNS query;

receive a DNS response;

upon determining that the received DNS response includes an ECS option that corresponds to one of the one or more ECS option of the DNS query, to which the DNS response has been tailored, trigger actions to set up traffic steering according to the ECS option; and upon successful completion of the actions triggered to set up the traffic steering, remove the ECS option from the DNS response and sending the DNS response to the UE.

* * * * *